(12) United States Patent  (10) Patent No.: US 8,116,577 B2
Ogawa                      (45) Date of Patent:     Feb. 14, 2012

(54) ENCODING METHOD, ENCODING DEVICE, ENCODING PROCESS PROGRAM, AND RECORDING MEDIUM ON WHICH ENCODING PROCESS PROGRAM IS RECORDED

(75) Inventor: Kaname Ogawa, Kanagawa (JP)

(73) Assignee: Sony Corporation (JP)

( * ) Notice: Subject to any disclaimer, the term of this patent is extended or adjusted under 35 U.S.C. 154(b) by 953 days.

(21) Appl. No.: 11/885,855

(22) PCT Filed: Jan. 19, 2006

(86) PCT No.: PCT/JP2006/301173
§ 371 (c)(1),
(2), (4) Date: May 6, 2008

(87) PCT Pub. No.: WO2006/095501
PCT Pub. Date: Sep. 14, 2006

(65) Prior Publication Data
US 2009/0074313 A1    Mar. 19, 2009

(30) Foreign Application Priority Data
Mar. 7, 2005  (JP) ................... P2005-061758

(51) Int. Cl.
G06K 9/36 (2006.01)

(52) U.S. Cl. ...................... 382/238; 382/232

(58) Field of Classification Search .......... 382/232–252; 375/240.03, 240.13; 386/46
See application file for complete search history.

(56) References Cited

U.S. PATENT DOCUMENTS

| | | | |
|---|---|---|---|
| 6,201,896 B1 * | 3/2001 | Ishikawa ..................... 382/236 |
| 6,259,736 B1 * | 7/2001 | Chujoh et al. ........... 375/240.13 |
| 7,606,436 B2 * | 10/2009 | Awano ......................... 382/252 |
| 2002/0136295 A1 * | 9/2002 | Sato ....................... 375/240.03 |
| 2004/0013399 A1 * | 1/2004 | Horiguchi et al. ............. 386/46 |

FOREIGN PATENT DOCUMENTS

| | | |
|---|---|---|
| JP | 07-075095 A | 3/1995 |
| JP | 10-075451 A | 3/1998 |
| JP | 11-168724 A | 6/1999 |
| JP | 2001-028753 A | 1/2001 |
| JP | 2001-148858 A | 5/2001 |
| JP | 2004-266640 A | 9/2004 |
| WO | 03/056839 A1 | 7/2003 |

* cited by examiner

*Primary Examiner* — Duy M Dang

(74) *Attorney, Agent, or Firm* — Lerner, David, Littenberg, Krumholtz & Mentlik, LLP

(57) ABSTRACT

The present invention is applicable to video cameras, for example. The present invention encodes input image data D1 on the basis of a true predicted code quantity TRUE PRED(n) calculated by correcting a roughly calculated predicted code quantity ROUGH PRED(n), predicted from the input image data D1, with a correction coefficient ADJUST(n) and sets the correction coefficient ADJUST(n) of a corresponding picture type on the basis of an actual generated code quantity BIT(n).

23 Claims, 14 Drawing Sheets

ENCODING METHOD, ENCODING DEVICE, ENCODING PROCESS PROGRAM, AND RECORDING MEDIUM ON WHICH ENCODING PROCESS PROGRAM IS RECORDED

CROSS-REFERENCES TO RELATED APPLICATIONS

The present application is a national phase entry under 35 U.S.C. §371 of International Application No. PCT/JP2006/301173 filed on Jan. 19, 2006, published on Sep. 14, 2006 as WO 2006/095501 A1, which claims priority from Japanese Patent Application No. JP 2005-061758 filed in the Japanese Patent Office on Mar. 7, 2005.

BACKGROUND OF INVENTION

1. Technical Field

The present invention relates to an encoding method, an encoding device, an encoding process program, and a recording medium on which the encoding process program is recorded, and is applicable to video cameras, for example. The present invention encodes input image data on the basis of a true predicted code quantity calculated by correcting a roughly calculated predicted code quantity, predicted from the input image data, with a correction coefficient and sets the correction coefficient of a corresponding picture type on the basis of an actual generated code quantity. The present invention makes it possible to allocate an appropriate code quantity to each picture when a recording time is to be guaranteed by a one-pass system, and when there are many prediction modes, accordingly.

2. Background Art

Conventionally, VBR (Variable Bit Rate) encoding control and CBR (Constant Bit Rate) encoding control are widely known in motion-compensated predictive coding. The VBR encoding control is a method of encoding a moving image by a fixed quantization scale set in advance. On the other hand, the CBR encoding control is a method of performing encoding control while changing the quantization scale so that a generated code quantity becomes a predetermined target value.

The VBR encoding control changes the generated code quantity in various manners according to an object being processed, and therefore cannot guarantee a recordable time when moving images are recorded onto a recording medium. Therefore, in recording moving images or the like, a recording time is guaranteed mainly by the CBR encoding control.

However, the CBR encoding control may encode a picture, which can be coded easily, with an unnecessarily high picture quality, and is thus still practically unsatisfactory in terms of encoding efficiency. Japanese Patent Laid-open No. 2001-28753, for example, proposes a method for improving encoding efficiency by performing an encoding process with switching between the VBR encoding control and the CBR encoding control.

In the CBR encoding control, there are a so-called two-pass system in which a tentative encoding process is performed by a fixed quantization scale and a generated code quantity is measured, and a quantization scale is varied according to a result of the measurement and an actual encoding process is performed, and a so-called one-pass system in which a quantization scale is varied in real time while a generated code quantity is predicted. The one-pass system requires an amount of operation that is about ½ of that of the two-pass system, and can process moving pictures in real time. The one-pass system is therefore employed in various recording devices.

However, the one-pass system is still practically unsatisfactory in terms of allocating an appropriate code quantity to each picture and encoding moving pictures with high picture quality.

Specifically, the one-pass system varies the quantization scale by feedback control according to the generated code quantity, and can thus adjust a compression ratio only after one picture is encoded. Thus, it is difficult to vary the quantization scale so as to follow changes in picture quality well, so that allocation of an appropriate code quantity is not necessarily performed when the code quantity of each picture is observed.

A method proposed to solve this problem detects a feature quantity indicating a degree of difficulty of an encoding process, such for example as a high-frequency component, for each picture, and controls the quantization scale by feedforward control with a result of the detection as a basis. This method can generally allocate an appropriate code quantity to each picture in an encoding process of MPEG-2, for example.

However, encoding methods of this type include methods in which an optimum prediction mode is selected from many prediction modes and an encoding process is performed, such as H.264/AVC (Advanced Video Coding) and MPEG (Moving Picture Experts Group)-4. In such encoding methods, a correlation between the feature quantity and the generated code quantity is significantly reduced. Thus, even with the methods, it is difficult to allocate an appropriate code quantity in an encoding process in which there are such a large number of prediction modes.

DISCLOSURE OF INVENTION

The present invention has been made in view of the above. It is desirable to propose an encoding method, an encoding device, an encoding process program, and a recording medium on which the encoding process program is recorded that make it possible to allocate an appropriate code quantity to each picture even when a recording time is to be guaranteed by the one-pass system, and even when there are many prediction modes.

According to the present invention, there is provided an encoding method in which a picture type is sequentially set to pictures of input image data, the input image data is encoded while predicting a generated code quantity of each picture, and encoded data is generated, the encoding method including the steps of: predicting a roughly calculated code quantity of the encoded data generated from the input image data; calculating a true predicted code quantity by correcting the roughly calculated predicted code quantity by a correction coefficient corresponding to the picture type; encoding the input image data on a basis of the true predicted code quantity; and setting the correction coefficient of the corresponding picture type with detecting an actual generated quantity of the encoded data.

According to the present invention, there is provided an encoding method in which a picture type is sequentially set to pictures of input image data, the input image data is encoded while predicting a generated code quantity of each picture, and encoded data is generated, the encoding method including the steps of: predicting a roughly calculated code quantity of the encoded data generated from the input image data; calculating a true predicted code quantity by correcting the roughly calculated predicted code quantity by a correction coefficient corresponding to the picture type; encoding the input image data on a basis of the true predicted code quantity; and setting the correction coefficient of the corresponding picture type with detecting an actual generated code quantity of said encoded data. Then, even when there are a large number of prediction modes, and the generated code quantity cannot be predicted accurately by the roughly calculated predicted code quantity, the generated code quantity can be predicted with a practically sufficient accuracy by the true predicted code quantity obtained by the correction coefficient. Thus, by using the true predicted code quantity having such a high accuracy, it is possible to allocate an appropriate code quantity to each picture even when a recording time is to be guaranteed by the one-pass system, and even when there are many prediction modes.

Further, according to the present invention, in the configuration of claim 1, the encoding step encodes the input image data of at least a picture at a start of a sequence of each picture type by a fixed quantization scale set in advance; with a ratio between a feature quantity, indicating a degree of difficulty of encoding, which is detected in the picture at the start of the sequence and the feature quantity detected in a picture to be encoded, the roughly calculated code quantity predicting step calculates the roughly calculated predicted code quantity of the picture to be encoded on a basis of the actual generated code quantity of the encoded data obtained by the fixed quantization scale; and the encoding method changes an average generated code quantity of the encoded data by changing the fixed quantization scale in response to an operation by a user.

On the basis of the above configuration of the present invention that can detect the true predicted code quantity having such a high accuracy based on the configuration of claim 1, the encoding step encodes the input image data of at least a picture at a start of a sequence of each picture type by a fixed quantization scale set in advance; and with a ratio between a feature quantity, indicating a degree of difficulty of encoding, which is detected in the picture at the start of the sequence and the feature quantity detected in a picture to be encoded, the roughly calculated code quantity predicting step calculates the roughly calculated predicted code quantity of the picture to be encoded on a basis of the actual generated code quantity of the encoded data obtained by the fixed quantization scale. Then, with the generated code quantity obtained by the fixed quantization scale as a reference, the generated code quantity of each picture is predicted, and the encoding process is performed. Thus, the fixed quantization scale can be a basis for setting the generated code quantity of the encoded data. The encoding method can easily set the average rate of the generated code quantity by changing the average generated code quantity of the encoded data by changing the fixed quantization scale in response to an operation by a user.

Still further, according to the present invention, in the configuration of claim 1, the encoding method includes the steps of: setting a target code quantity of an encoding process on the basis of the true predicted code quantity; and correcting the true predicted code quantity; wherein the encoding step encodes the input image data on the basis of the true predicted code quantity by setting a quantization scale such that the actual generated code quantity of the encoded data becomes the target code quantity, and the correcting step corrects the true predicted code quantity to a generated code quantity predicted when the quantization scale is set to a certain reference quantization scale.

On the basis of the configuration according to the present invention, that can detect the true predicted code quantity having such a high accuracy based on the configuration of claim 1, the encoding method includes the steps of: setting a target code quantity of an encoding process on the basis of the true predicted code quantity; and correcting the true predicted code quantity; wherein the encoding step encodes the input image data on the basis of the true predicted code quantity by setting a quantization scale such that the actual generated code quantity of the encoded data becomes the target code quantity, and the correcting step corrects the true predicted code quantity to a generated code quantity predicted when the quantization scale is set to a certain reference quantization scale. Thus, even when the target code quantity is set from the true predicted code quantity for a CBR, for example, and the encoding process is performed, the generated code quantity can be predicted based on the encoding process with the certain reference quantization scale. It is thereby possible to further improve the accuracy of prediction of the generated code quantity, and accordingly allocate an appropriate code quantity to each picture with a higher accuracy.

Further, according to the present invention, in the configuration of claim 8, the encoding step encodes the input image data of at least a picture at a start of a sequence of each picture type by a fixed quantization scale set in advance; with a ratio between a feature quantity, indicating a degree of difficulty of encoding, which is detected in the picture at the start of the sequence and the feature quantity detected in the picture to be encoded, the roughly calculated code quantity predicting step calculates the roughly calculated predicted code quantity of the picture to be encoded on a basis of the actual generated code quantity of the encoded data obtained by the fixed quantization scale; and the encoding method changes an average generated code quantity of the encoded data by changing the fixed quantization scale in response to an operation by a user.

On the basis of the above configuration of the present invention that can detect the true predicted code quantity having such a high accuracy based on the configuration of claim 8, the encoding step encodes the input image data of at least a picture at a start of a sequence of each picture type by a fixed quantization scale set in advance; and with a ratio between a feature quantity indicating a degree of difficulty of encoding which quantity is detected in the picture at the sequence start and a feature quantity detected in the picture to be encoded, the roughly calculated code quantity predicting step calculates the roughly calculated predicted code quantity of the picture to be encoded on a basis of the actual generated code quantity of the encoded data obtained by the fixed quantization scale. Then, with the generated code quantity obtained by the fixed quantization scale as a reference, the generated code quantity of each picture is predicted, and the encoding process is performed. Thus, the fixed quantization scale can be a basis for setting the generated code quantity of the encoded data. The encoding method can easily set the average rate of the generated code quantity by changing the average generated code quantity of the encoded data with changing the fixed quantization scale in response to an operation by a user.

Moreover, according to the present invention, in the configuration of claim 1, the encoding method includes the step of setting a target code quantity of an encoding process on the basis of the true predicted code quantity, wherein the encoding step encodes the input image data by setting a quantization scale such that the actual generated code quantity of the encoded data becomes the target code quantity, the roughly calculated code quantity predicting step also obtains roughly calculated predicted code quantities for other picture types when a picture to be encoded is encoded as the other picture types, the true code quantity predicting step also obtains true predicted code quantities for the other picture types from the roughly calculated predicted code quantities, and the target code quantity setting step allots an allocatable code quantity on the basis of the true predicted code quantity for the corresponding picture type and the true predicted code quantities for the other picture types, and sets the target code quantity.

On the basis of the above configuration of the present invention that can detect the true predicted code quantity having such a high accuracy based on the configuration of claim 1, the encoding method includes the step of setting a target code quantity of an encoding process on the basis of the true predicted code quantity, wherein the encoding step encodes the input image data by setting a quantization scale such that the actual generated code quantity of the encoded data becomes the target code quantity, the roughly calculated code quantity predicting step also obtains roughly calculated predicted code quantities for other picture types when a picture to be encoded is encoded as the other picture types, the true code quantity predicting step also obtains true predicted code quantities for the other picture types from the roughly calculated predicted code quantities, and the target code quantity setting step allots an allocatable code quantity on the basis of the true predicted code quantity for the corresponding picture type and the true predicted code quantities for the other picture types, and sets the target code quantity. Then, even when a degree of difficulty of encoding in pictures is gradually changing, the code quantity to be allocated to each picture can be set in response to this change. It is thereby possible to allocate a more appropriate code quantity to each picture.

Further according to the present invention, in the configuration of claim 1, the encoding method further includes the step of setting a target code quantity of an encoding process on the basis of the true predicted code quantity, wherein the encoding step encodes the input image data by setting a quantization scale such that the actual generated code quantity of the encoded data becomes the target code quantity, when the true predicted code quantity is smaller than a certain value larger than a reference value for the image quality improvement, the target code quantity setting step sets the true predicted code quantity to the target code quantity so as to generate the encoded data with a VBR, when the true predicted code quantity is larger than the certain value, the target code quantity setting step sets a code quantity corresponding to the certain value to the target code quantity so as to generate the encoded data with a CBR, and when the true predicted code quantity is smaller than the reference value for picture quality improvement, the target code quantity setting step sets the true predicted code quantity to the target code quantity increased by a coefficient, wherein the coefficient increases as the true predicted code quantity is decreased.

On the basis of the above configuration of the present invention that can detect the true predicted code quantity having such a high accuracy based on the configuration of claim 1, the encoding method further includes the step of setting a target code quantity of an encoding process on a basis of the true predicted code quantity, wherein the encoding step sets a quantization scale such that the actual generated code quantity of the encoded data becomes the target code quantity, and encodes the input image data, when the true predicted code quantity is smaller than a certain value larger than a reference value for image quality improvement, the target code quantity setting step sets the target code quantity so as to generate the encoded data with a VBR by setting the true predicted code quantity as the target code quantity, when the true predicted code quantity is larger than the certain value, the target code quantity setting step sets the target code quantity so as to generate the encoded data with a CBR by setting a code quantity corresponding to the certain value as the target code quantity, and when the true predicted code quantity is smaller than the reference value for picture quality improvement, the target code quantity setting step increases the true predicted code quantity by a coefficient that increases as the true predicted code quantity is decreased, and sets the true predicted code quantity as the target code quantity. Then, it is possible to encode, by increasing the code quantity, an image that is easy to encode and results in a small generated code quantity. Degradation in image quality of such an image tends to be relatively noticeable. The image quality can thereby be improved.

Further, according to the present invention, there is provided an encoding device in which a picture type is sequentially set to pictures of input image data, the input image data is encoded while predicting a generated code quantity of each picture, and encoded data is generated, the encoding device including: roughly calculated code quantity predicting means for predicting a roughly calculated code quantity of the encoded data generated from the input image data; true code quantity predicting means for calculating a true predicted code quantity by correcting the roughly calculated predicted code quantity by a correction coefficient corresponding to the picture type; encoding means for encoding the input image data on a basis of the true predicted code quantity; and coefficient setting means for setting the correction coefficient of the corresponding picture type with detecting an actual generated code quantity of the encoded data.

According to the configuration of the present invention, it is possible to provide an encoding device which makes it possible to allocate an appropriate code quantity to each picture even when a recording time is to be guaranteed by the one-pass system, and even when there are many prediction modes.

Still further, according to the present invention, there is provided an encoding process program executed by arithmetic processing means, for sequentially setting a picture type to pictures of input image data, encoding the input image data while predicting a generated code quantity of each picture, and generating encoded data, the encoding process program including the steps of: predicting a roughly calculated code quantity of the encoded data generated from the input image data; calculating a true predicted code quantity by correcting the roughly calculated predicted code quantity by a correction coefficient corresponding to the picture type; encoding the input image data on a basis of the true predicted code quantity; and setting the correction coefficient of the corresponding picture type with detecting an actual generated code quantity of the encoded data.

According to the configuration of the present invention, it is possible to provide an encoding process program that allocates an appropriate code quantity to each picture even when a recording time is to be guaranteed by the one-pass system, and even when there are many prediction modes.

Yet further, according to the present invention, there is provided a recording medium on which an encoding process program executed by arithmetic processing means, for sequentially setting a picture type to pictures of input image data, encoding the input image data while predicting a generated code quantity of each picture, and generating encoded data is recorded, the encoding process program including the steps of: predicting a roughly calculated code quantity of the encoded data generated from the input image data; calculating a true predicted code quantity by correcting the roughly calculated predicted code quantity by a correction coefficient corresponding to the picture type; encoding the input image data on a basis of the true predicted code quantity; and setting the correction coefficient of the corresponding picture type with detecting an actual generated code quantity of the encoded data.

According to the configuration of the present invention, it is possible to provide a recording medium on which encoding process program is recorded that allocates an appropriate code quantity to each picture even when a recording time is to be guaranteed by the one-pass system, and even when there are many prediction modes.

According to the present invention, it is possible to allocate an appropriate code quantity to each picture even when a recording time is to be guaranteed by the one-pass system, and even when there are many prediction modes.

BEST MODE FOR CARRYING OUT THE INVENTION

Figure 1:
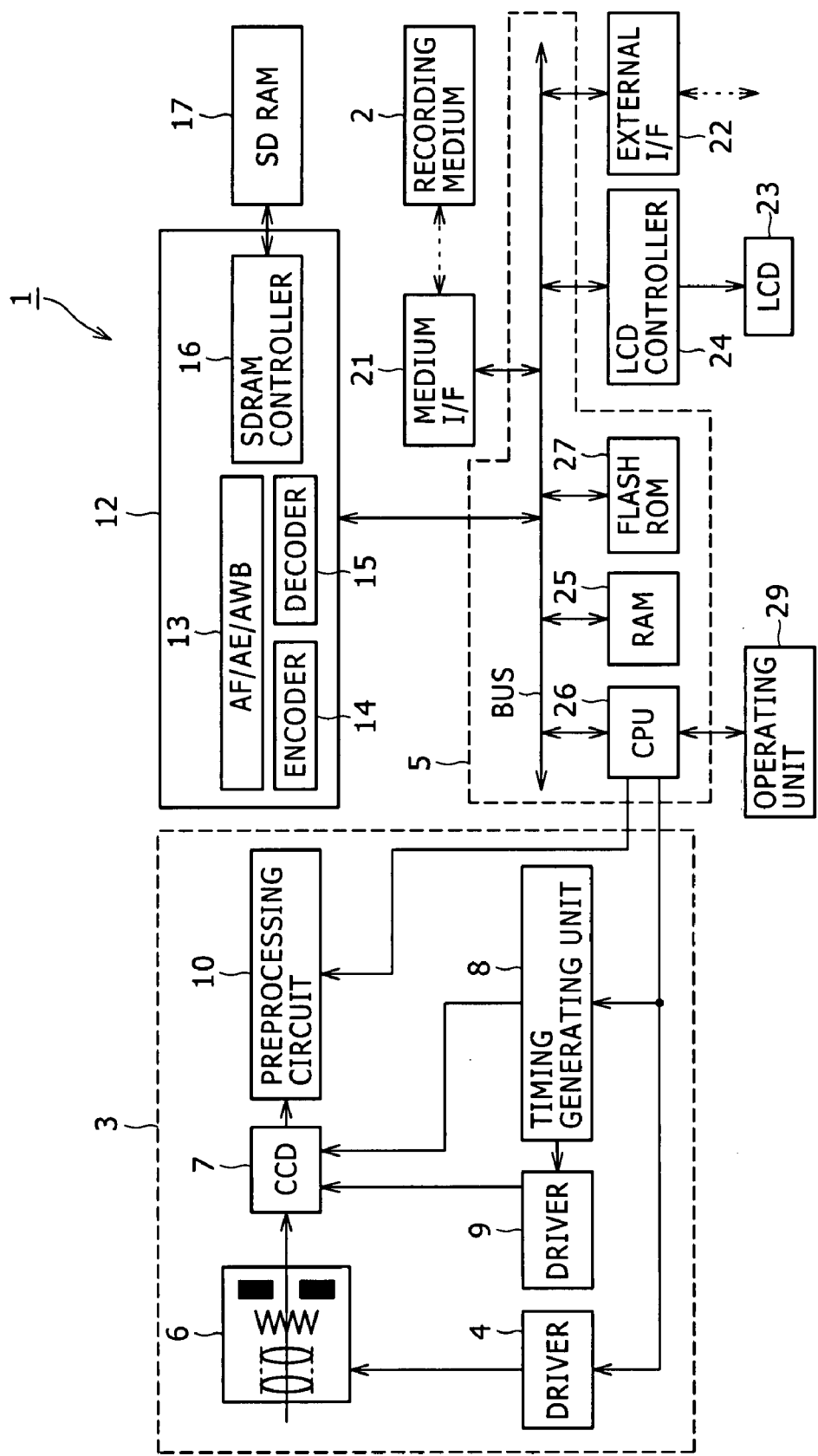
FIG. 1 is a block diagram showing the digital video camera according to an embodiment of the present invention.

Preferred embodiments of the present invention will hereinafter be described in detail, referring to the drawings as appropriate.

(1) Configuration of Embodiment 1

FIG. 1 is a block diagram showing a digital video camera according to an embodiment of the present invention. The digital video camera 1 encodes a result of picking up an image of a desired subject, and records the result on a recording medium 2. For this, a camera unit 3 in the digital video camera 1 obtains a result of image pickup, and then outputs image data.

Specifically, a driver 4 in the camera unit 3 drives a diaphragm, a focus lens, and a zoom lens of an optical block 6 under control of a controlling unit 5. The optical block 6 collects incident light under conditions of the driving by the driver 4, and forms an optical image on an image pickup surface of a following CCD (Charge Coupled Device) solid-state image pickup device 7. A timing generating unit 8 generates and outputs various timing signals for the CCD solid-state image pickup device 7 under control of the controlling unit 5. A driver 9 drives the CCD solid-state image pickup device 7 by a part of the various timing signals output from the timing generating unit 8. The CCD solid-state image pickup device 7 operates according to the timing signals directly input from the timing generating unit 8 and the timing signal input via the driver 9. The CCD solid-state image pickup device 7 outputs a result of picking up the optical image on the image pickup surface. A preprocessing circuit 10 subjects the image pickup result of the CCD solid-state image pickup device to a correlated double sampling process, thereafter amplifies the image pickup result with a gain controlled by the controlling unit 5, and then subjects the image pickup result to an analog-to-digital conversion process. The preprocessing circuit 10 outputs image data as a result of the process to a camera DSP 12.

The camera DSP 12 subjects the image data output from the camera unit 3 to signal processing, thereafter encodes the image data, and then outputs the image data to the controlling unit 5. In addition, the camera DSP 12 conversely decodes encoded data input from the controlling unit 5.

Specifically, an AF/AE/AWB unit 13 in the camera DSP 12 obtains various information necessary for automatic focus control and automatic diaphragm control from the image data output from the camera unit 3, and outputs the information to the controlling unit 5. The AF/AE/AWB unit 13 also subjects the image data to automatic white balance adjustment under control of the controlling unit 5, and then outputs the result to the controlling unit 5 and the like. Incidentally, in addition to these processes, the AF/AE/AWB unit 13 performs various processes such as a knee process, a gamma correction process, a matrix operation process and the like necessary to process the image pickup result. An encoder 14 is an encoding device that generates encoded data by encoding image data by motion compensation and an orthogonal transform. Under control of the controlling unit 5, the encoder 14 generates encoded data by encoding the image data processed by the AF/AE/AWB unit 13, and then outputs the encoded data to the controlling unit 5. A decoder 15 conversely decodes encoded data input from the controlling unit 5, and then outputs image data as a result of the process to the controlling unit 5. An SDRAM controller 16 controls writing and reading in an SDRAM 17 as a memory external to the camera DSP 12. The SDRAM controller 16 temporarily stores the image data and the encoded data associated with the series of processes of the camera DSP 12 in the SDRAM 17.

Incidentally, a program associated with the series of processes of the camera DSP 12 is provided by being installed in advance in the digital video camera 1. However, instead of being provided by such an advance installation, the program may be provided by being downloaded via a network such as the Internet or the like, or may be provided by being recorded on a recording medium. Incidentally, various recording media such as an optical disk, a magnetic disk, a memory card, and the like can be widely applied as such a recording medium.

Encoded data encoded by the encoder 14 and the like are recorded on the recording medium 2. Also, the encoded data recorded on the recording medium 2 is reproduced and output. Various recording media such as an optical disk, a magnetic disk, a memory card, and the like can be widely applied as the recording medium 2. A medium interface (medium I/F) 21 under control of the controlling unit 5 records data output from the controlling unit 5 onto the recording medium 2, and reads the data recorded on the recording medium 2 and then outputs the data to the controlling unit 5.

An external interface (external I/F) 22 is an interface for connecting an external device such for example as a personal computer. Under control of the controlling unit 5, the external interface 22 outputs data output from the controlling unit 5 to the external device, and outputs data input from the external device to the controlling unit 5. The digital video camera 1 thereby sends and receives various data such as image data, encoded data and the like to and from the external device.

An LCD controller 24 drives a liquid crystal display (LCD) device 23 on the basis of image data output to a bus BUS in the controlling unit 5 under control of the controlling unit 5. The liquid crystal display device 23 thereby displays image data as a result of image pickup and image data as a result of decoding output to the bus BUS.

The controlling unit 5 is controlling means for controlling the operation of the whole of the digital video camera 1. By securing a work area in a random access memory (RAM) 25 and executing a processing program recorded in a flash memory ROM 27 by a central processing unit (CPU) 26, the controlling unit 5 starts the operation of the camera unit 3 and the camera DSP 12 in response to an operation of an operating unit 29 to process a result of image pickup obtained by the camera unit 3 by the camera DSP 12 and thereby subject the result of image pickup to an encoding process, obtain encoded data as a result of the process, and record the encoded data onto the storage medium 2. In addition, the controlling unit 5 obtains image data as the result of image pickup, and displays a monitor image by the liquid crystal display device 23. In these processes, the controlling unit 5 controls the diaphragm and the focus of the camera unit 3 on the basis of the information obtained from the camera DSP 12, and thereby performs the process of automatic diaphragm control and automatic focus control. Further, in response to an operation by a user, the controlling unit 5 reads encoded data recorded on the recording medium 2, decodes the encoded data by the camera DSP 12, obtains image data as a result of the process, and then displays a monitor image by the liquid crystal display device 23.

In these processes, the controlling unit 5 changes a parameter used in the process of the encoder 14 to be described later in response to an operation of the operating unit 29 by the user. The controlling unit 5 thereby switches the operation mode of the whole of the digital video camera 1 between a long-time recording mode and a standard-time recording mode, and changes the bit rate of encoded data generated by the encoder 14. The controlling unit 5 thus changes the recordable time of the recording medium 2, and records results of image pickup onto the recording medium 2 for a recording time corresponding to each operation mode.

Figure 2:
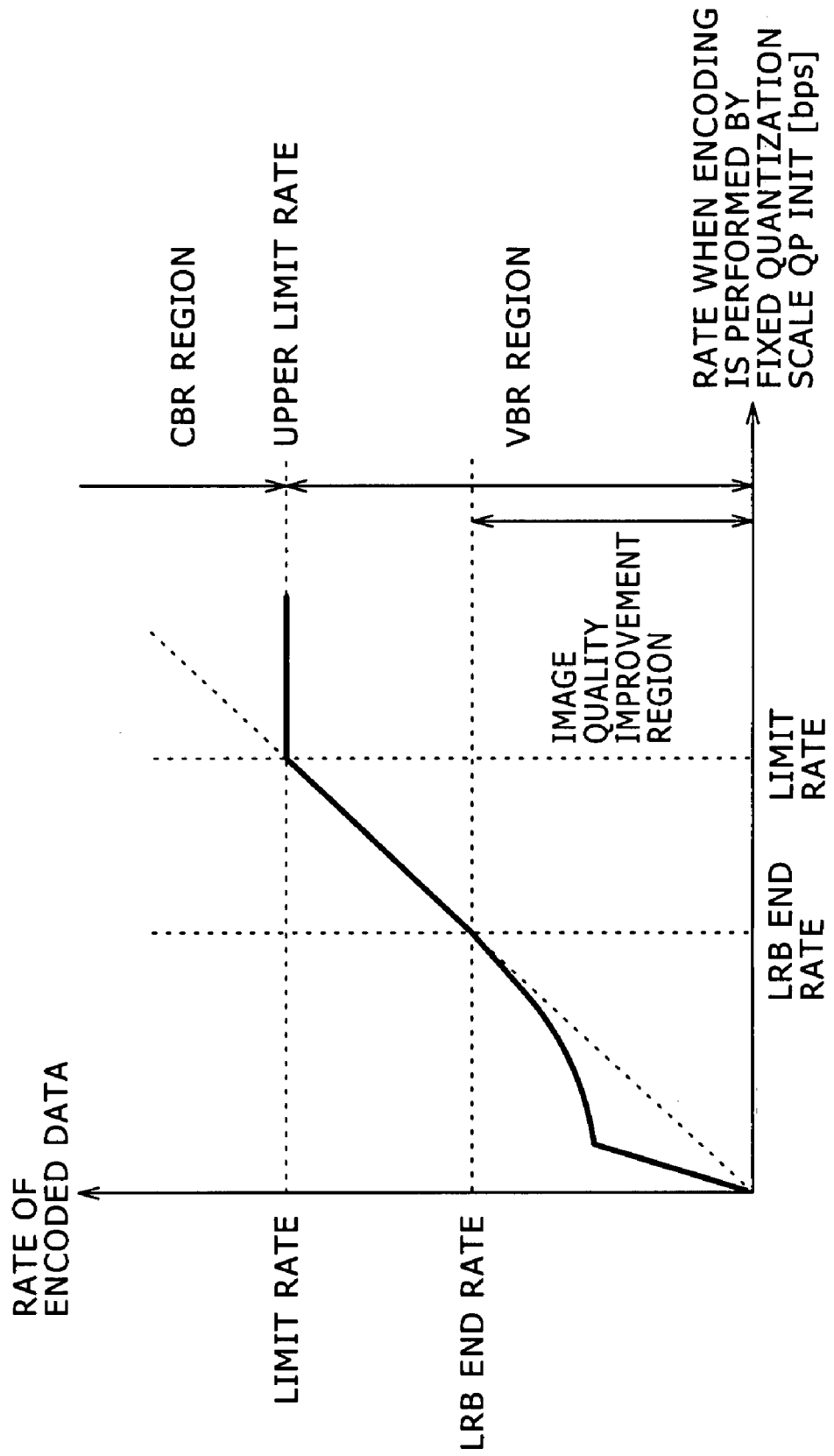
FIG. 2 is a characteristic curve diagram showing characteristics of the encoder applied to the digital video camera of FIG. 1.

FIG. 2 is a characteristic curve diagram showing characteristics associated with encoding control for encoded data thus recorded onto the recording medium 2. When a quantity of code generated by quantization by a fixed quantization scale QP INIT become greater than a certain upper limit rate LIMIT RATE, as shown on an axis of abscissas, the encoder 14 performs encoding control so that the rate of the encoded data becomes the certain upper limit value LIMIT RATE. Thus, in this case, the encoder 14 encodes input image data by a CBR method. On the other hand, when the quantity of code generated by quantization by the fixed quantization scale QP INIT is smaller than the certain upper limit rate LIMIT RATE, the encoder 14 encodes the input image data by a VBR method according to the fixed quantization scale QP INIT. The encoder 14 thus prevents allocation of an unnecessary code quantity by changing the encoding control to the VBR method as the code quantity is decreased while guaranteeing a recording time for which recording onto the recording medium 2 is performed. By thus switching between the VBR method and the CBR method, encoding efficiency is improved, and the recording time is guaranteed.

In thus encoding the input image data by the VBR method, when the quantity of code generated by quantization by the fixed quantization scale QP INIT is smaller than an image quality control boundary rate LRB END RATE, the encoder 14 controls a generated code quantity so that the code quantity of encoded data is temporarily increased in relation to the code quantity obtained by the fixed quantization scale QP INIT as the code quantity obtained by the fixed quantization scale QP INIT is decreased from a code quantity at the image quality control boundary rate LRB END RATE.

Thereby the encoder 14 intentionally allocates a larger code quantity to a subject that is relatively easy to encode, and performs the encoding process, whereby the image quality of such a subject is improved.

Figure 3:
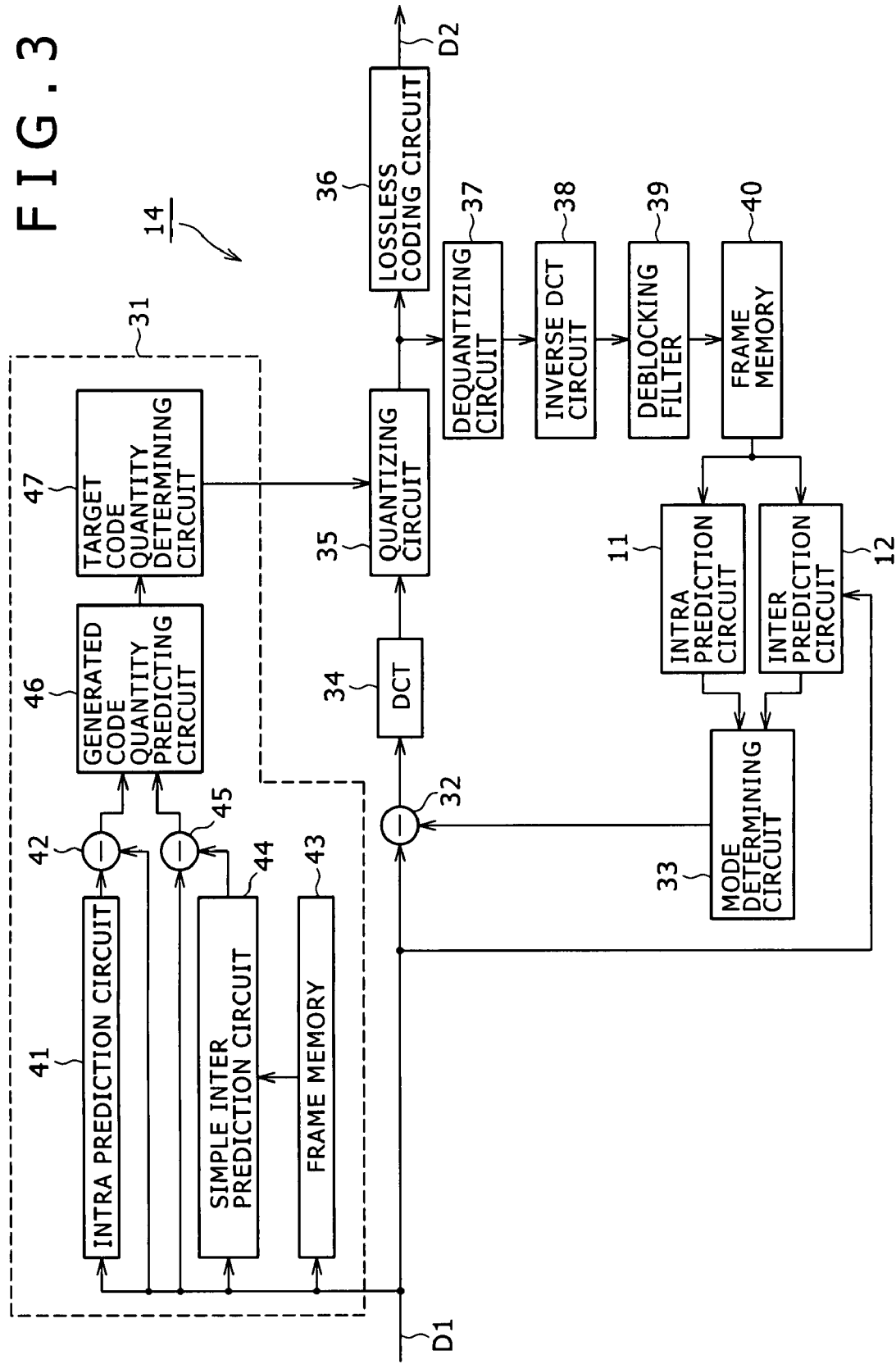
FIG. 3 is a block diagram showing the digital video camera applied to the digital video camera of FIG. 1.

FIG. 3 is a block diagram showing details of a configuration of the encoder 14 applied to the digital video camera 1. The encoder 14 selects an optimum prediction mode from many prediction modes. The encoder 14 performs an orthogonal transform and motion compensation and thereby encodes image data D1 in the optimum prediction mode. More specifically, the encoder 14 encodes the image data by an AVC method. Thereby the encoder 14 sequentially sets a picture type to pictures of the input image data D1 input sequentially, and encodes the image data D1 while predicting a quantity of code generated in each picture by a one-pass system.

For this, the encoder 14 inputs the image data D1 to a discrete cosine transform (DCT) circuit 34 via a subtracting circuit 32. The discrete cosine transform circuit 34 subjects the output data of the subtracting circuit 32 to an orthogonal transform process by a discrete cosine transform process, and then outputs coefficient data.

A quantizing circuit 35 changes a quantization scale under control of an encoding control circuit 31, and quantizes the coefficient data output from the discrete cosine transform circuit 34. A lossless coding circuit 36 subjects the output data of the quantizing circuit 35 to a lossless coding process, and then outputs the result as encoded data D2 together with data on the quantization scale and the prediction mode and the like.

A dequantizing circuit 37 subjects the output data of the quantizing circuit 35 to a dequantization process to thereby decode the input data of the quantizing circuit 35. An inverse discrete cosine transform (inverse DCT) circuit 38 subjects the output data of the dequantizing circuit 37 to an inverse discrete cosine transform process to thereby decode the input data of the discrete cosine transform circuit 34. In the encoder 14, the output data of a mode determining circuit 33 is added to the output data of the inverse discrete cosine transform circuit 38 to thereby decode the input image data input to the subtracting circuit 32. A deblocking filter 39 subjects the decoded input image data to a filtering process, thereby removes block distortions, and then outputs the result. A frame memory 40 retains predetermined frames of the output data of the deblocking filter 39.

An intra prediction circuit 11 detects an optimum intra prediction mode from a plurality of intra prediction modes using the image data of a same picture retained in the frame memory 40. An inter prediction circuit 12 detects an optimum inter prediction mode from a plurality of inter prediction modes using the image data of a plurality of prediction frames retained in the frame memory 40.

The mode determining circuit 33 generates the predicted image data of an I-picture in the optimum intra prediction mode detected by the intra prediction circuit 41. The mode determining circuit 33 outputs the predicted image data to the subtracting circuit 32. Thus, in the I-picture, the encoder 14 selects the optimum prediction mode from a large number of intra prediction modes, subjects prediction residual data in the optimum prediction mode to an orthogonal transform process and a variable length coding process, and thereby generates encoded data D2.

Further, in a P-picture and a B-picture, the mode determining circuit 33 selects an optimum prediction mode from the optimum prediction mode detected by the intra prediction circuit 11 and the optimum prediction mode detected by the inter prediction circuit 12, and outputs predicted image data in the selected prediction mode to the subtracting circuit 32. Thus, in the P-picture and the B-picture, the encoder 14 selects the optimum prediction mode from a large number of intra prediction modes and inter prediction modes, subjects prediction residual data in the optimum prediction mode to the orthogonal transform process and the variable length coding process, and thereby generates encoded data D2.

An encoding control circuit 31 controls the quantization scale in the quantizing circuit 35 in the encoder 14, and thereby controls the code quantity of the encoded data D2.

Specifically, an intra prediction circuit 41 in the encoding control circuit 31 generates pseudo predicted image data associated with intra prediction from the input image data D1. In AVC, a plurality of prediction modes are set for each of a block of 16×16 pixels and a block of 4×4 pixels, and an optimum prediction mode is selected from these prediction modes to generate predicted image data. This intra prediction circuit 41 generates the pseudo predicted image data exhibiting a similar tendency to that of the proper predicted image data. This pseudo prediction is performed as a simplified version of proper prediction, such for example as a prediction in only a specific mode. Also, a result of prediction of a temporally preceding picture may be used.

A subtracting circuit 42 subtracts the pseudo predicted image data output from the intra prediction circuit 41 from the input image data D1, and thereby generates pseudo prediction residual data associated with intra prediction. The intra prediction circuit 41 thus detects a feature quantity indicating a degree of difficulty of encoding associated with intra prediction.

A frame memory 43 records and retains predetermined frames of the input image data D1, and outputs the frames as reference image data to a simple inter prediction circuit 44.

The simple inter prediction circuit 44 generates pseudo predicted image data associated with inter prediction using the image data retained in the frame memory 43. In AVC, using a plurality of prediction frames, a motion vector is detected with an accuracy smaller than a one-pixel accuracy in blocks of different sizes, and predicted image data is generated by prediction frames and blocks where a generated code quantity is smallest. The simple inter prediction circuit 44 generates the pseudo predicted image data exhibiting a similar tendency to that of the proper predicted image data. Specifically, a motion vector is detected with an integral pixel accuracy for only macroblocks as blocks of 16×16 pixels in each prediction frame, an optimum prediction mode is detected, and predicted image data based on a result of the detection is output. Incidentally, in this case, the input image data D1 may be downsampled for the process. Further, the predicted image data may be generated in a prediction mode having a highest probability of being selected as prediction mode among a plurality of prediction modes for these 16×16 pixel blocks.

A subtracting circuit 45 subtracts the pseudo predicted image data output from the simple inter prediction circuit 44 from the input image data D1, and thereby generates pseudo prediction residual data associated with inter encoding. Incidentally, results of processing by the intra prediction circuit 41 and the simple inter prediction circuit 44 may be used in processing by the proper intra prediction circuit 11 and the proper inter prediction circuit 12 so that the entire process is simplified.

The frame memory 43, the simple inter prediction circuit 44, and the subtracting circuit 45 thus detect a feature quantity indicating a degree of difficulty of encoding associated with inter prediction with a 16×16 pixel block as a unit. Incidentally, in detecting the feature quantities associated with intra prediction and inter prediction, various detection methods can be widely applied according to a trade-off between prediction accuracy and processing speed. For example, these feature quantities may be detected on the basis of the block size of a processing unit of orthogonal transform processing. Further, when a practically sufficient accuracy can be ensured, the signal level of a high-frequency component may be applied to the feature quantity associated with intra prediction.

A generated code quantity predicting circuit 46 predicts a generated code quantity of code generated by the encoding process on the basis of the prediction residual data output from the subtracting circuits 42 and 45.

On the basis of a result of the prediction by the generated code quantity predicting circuit 46, a target code quantity determining circuit 47 determines a target code quantity for the encoding process, and sets the quantization scale of the quantizing circuit 35.

Figure 4:
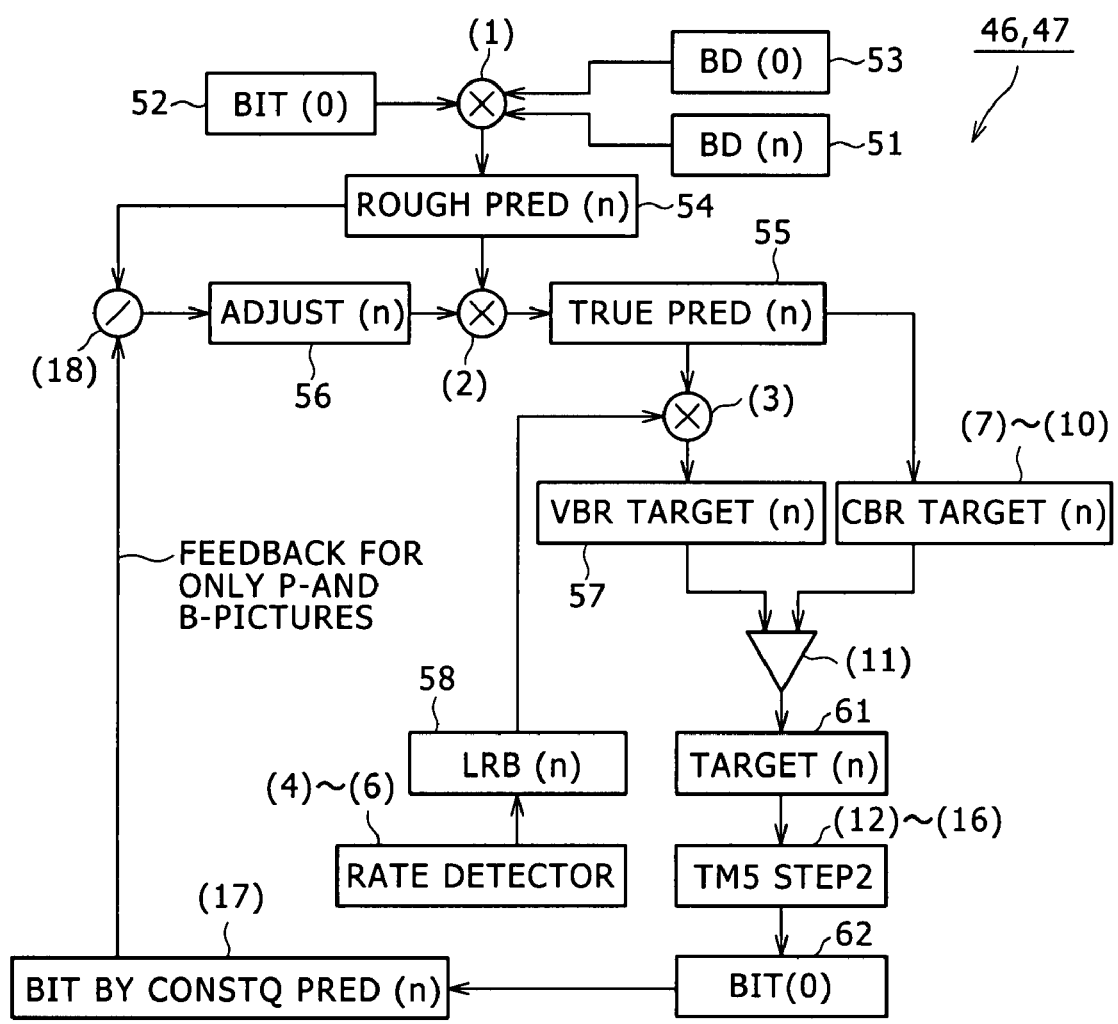
FIG. 4 is a block diagram showing a part of a configuration of an encoder of FIG. 3.

FIG. 4 is a functional block diagram showing details of a configuration of the generated code quantity predicting circuit 46 and the target code quantity determining circuit 47. Incidentally, in the configuration shown in FIG. 4, arithmetic circuits such as multiplying circuits and the like are identified by the references of corresponding equations to be described below, and correspondences therebetween are thereby indicated.

For a P-picture and a B-picture, the generated code quantity predicting circuit 46 sums prediction residual data output from the subtracting circuits 42 and 45 for each macroblock, and sets a total value on a smaller value side as residual data MB BD of the macroblock. Further, the generated code quantity predicting circuit 46 sums the macroblock residual data MB BD in each picture, and sets a total value as residual data BD(n) (indicated by reference numeral 51 in FIG. 4) of the picture. For an I-picture, the generated code quantity predicting circuit 46 sums prediction residual data associated with intra prediction, which data is output from the subtracting circuit 42, in a picture unit, and sets a total value as residual data BD(n) associated with intra prediction of the picture. Thus, the generated code quantity predicting circuit 46 detects a feature quantity indicating a degree of difficulty associated with the encoding process in a picture unit by the residual data BD(n). Incidentally, with the residual data BD(n), the feature quantity may be detected by an absolute value sum of the prediction residual data.

For a picture as a start of a sequence of each picture type, the target code quantity determining circuit 47 sets the quantization scale of the quantizing circuit 35 to a fixed quantization scale QP INIT set in advance. Thereby a picture as a start of each sequence is encoded at a fixed compression ratio by the fixed quantization scale QP INIT.

The generated code quantity predicting circuit 46 detects a generated code quantity BIT(0) (indicated by reference numeral 52 in FIG. 1) obtained by the fixed quantization scale QP INIT for each picture type. For a subsequent picture, the generated code quantity predicting circuit 46 predicts a roughly calculated predicted code quantity ROUGH PRED(n) (indicated by reference numeral 54 in FIG. 1) by performing the arithmetic processing of the following equation using the generated code quantity BIT(0) detected for the corresponding picture type. Residual data BD(0) (indicated by reference numeral 53 in FIG. 1) is the residual data BD(n) detected at the sequence start of the corresponding picture type.

$$\text{ROUGH\_PRED}(n)=\text{BIT}(0)*(BD(n)/BD(0)) \qquad (1)$$

Thus, the generated code quantity predicting circuit 46 encodes the start picture by the fixed quantization scale. With the actual generated code quantity obtained by the fixed quantization scale as a reference, the roughly calculated predicted code quantity of each picture is detected for each picture type on the basis of a relative change in the degree of difficulty with respect to the start picture.

When thus predicting the generated code quantity, the generated code quantity predicting circuit 46 also calculates a predicted code quantity predicted when the picture is encoded as other picture types. The generated code quantity predicting circuit 46 thereby predicts roughly calculated generated code quantities when each picture of the input image data D1 is encoded as an I-picture, a P-picture, and a B-picture.

Though the roughly calculated predicted code quantity ROUGH PRED(n) thus calculated roughly represents an actual generated code quantity, the roughly calculated predicted code quantity ROUGH PRED(n) has an error. The roughly calculated predicted code quantity ROUGH PRED(n) associated with a P-picture and a B-picture, in particular, has a large error. Thus, the generated code quantity predicting circuit 46 corrects the predicted code quantity ROUGH PRED(n) for each of the P-picture and the B-picture on the basis of an actual processing result up to an immediately preceding picture by the arithmetic processing of the following equation. The generated code quantity predicting circuit 46 thereby calculates a true predicted code quantity TRUE PRED(n) (indicated by reference numeral 55 in FIG. 4).

$$\text{TRUE\_PRED}(n)=\text{ROUGH\_PRED}(n)*\text{ADJUST}(n) \qquad (2)$$

where ADJUST(n) (indicated by reference numeral 56 in FIG. 4) is a correction coefficient for each picture type, and is derived by a process to be described later. The true predicted code quantity TRUE PRED(n) thus obtained is a prediction of a generated code quantity when each picture is encoded by the fixed quantization scale QP INIT applied in encoding the picture at the sequence start at a fixed compression ratio. According to a result of an experiment, it is confirmed that the true predicted code quantity TRUE PRED(n) coincides with an actual generated code quantity with a considerable accuracy.

Incidentally, in thus calculating the true predicted code quantity TRUE PRED(n) and performing the encoding process, when the quality of the moving image is greatly changed from that of the sequence start due to a scene change, for example, the process for a start of a sequence of each picture type as described above may be performed so that the true predicted code quantity TRUE PRED(n) is recalculated.

The target code quantity determining circuit 47 determines a VBR target code quantity and a CBR target code quantity on the basis of the thus obtained true predicted code quantity TRUE PRED(n). Incidentally, for the true predicted code quantity TRUE PRED(n) of an I-picture, the roughly predicted code quantity ROUGH PRED(n) is applied.

The target code quantity determining circuit 47 calculates a VBR target code quantity VBR TARGET(n) (indicated by reference numeral 57 in FIG. 4) by the arithmetic processing of the following equation using the true predicted code quantity TRUE PRED(n) detected for the picture type of the picture to be encoded.

$$\text{VBR\_TARGET}(n)=\text{TRUE\_PRED}(n)*LRB(n) \qquad (3)$$

where LRB(n) (indicated by reference numeral 58 in FIG. 4) is a coefficient for intentionally increasing the code quantity with respect to the code quantity obtained by the fixed quantization scale QP INIT for a purpose of image quality improvement as described above with reference to FIG. 2, and 1<LRB(n). The coefficient LRB(n) may be set manually while monitoring the image. However, in the present embodiment, the coefficient LRB(n) is set as follows so as to intentionally lower a compression ratio for a moving image with a low degree of difficulty and thereby make degradation in image quality less noticeable, as described above with reference to FIG. 2.

The target code quantity determining circuit 47 calculates the coefficient LRB(n) by performing the arithmetic processing of the following equation using a threshold rate LRB END RATE associated with the image quality improvement.

$$LRB(n)=(LRB\_END\_RATE/INSTANT\_RATE(n)-1)* \\ APPLY\_GAIN+1 \qquad (4)$$

where INSTANT RATE(n) is an instantaneous rate at an nth picture to be processed, and APPLY GAIN is a gain indicating a degree to which the compression ratio is thus lowered intentionally and is a coefficient adjusted in a range of 0 to 1. When the gain APPLY GAIN is a value of zero, the compression ratio is not lowered at all, and thus the effect of image quality improvement is zero. When the gain APPLY GAIN is a value of one, the target code quantity VBR TARGET(n) of the moving picture with a low degree of difficulty coincides with a code quantity for achieving the threshold rate LRB END RATE.

Thus, as the predicted code quantity TRUE PRED(n) obtained by the fixed quantization scale QP INIT is decreased from the threshold rate LRB END RATE, the target code quantity determining circuit 47 increases the target code quantity with respect to the code quantity obtained by the fixed quantization scale QP INIT.

The coefficient LRB(n) obtained by Equation (4) becomes an extremely high value for a picture with a very low degree of difficulty. Therefore, the value obtained by Equation (4) is limited to values of 2.5 to 3.0 by a limiter. An extreme increase in the target code quantity VBR TARGET(n) is thereby prevented.

The instantaneous rate INSTANT RATE(n) is obtained by the following equation. In the equation, I NUM, P NUM, and B NUM denote the numbers of I-pictures, P-pictures, and B-pictures, respectively, forming one GOP, and AVERAGE I BIT, AVERAGE P BIT, and AVERAGE B BIT denote the average generated code quantities of an I-picture, a P-picture, and a B-picture, respectively, and PICTURE RATE denotes the number of frames (frame rate) per second in the encoder 14.

$$\text{INSTANT\_RATE}(n)=(\text{AVERAGE\_I\_BIT}(n)* \\ I\_NUM+\text{AVERAGE\_P\_BIT}(n)*P\_NUM+\text{AV-} \\ \text{ERAGE\_B\_BIT}(n)*B\_NUM)*(\text{PICTUR-} \\ E\_RATE/(I\_NUM+P\_NUM+B\_NUM)) \qquad (5)$$

The average generated code quantity AVERAGE I BIT of an I-picture is obtained by the following equation.

$$AVERAGE\_I\_BIT(n) = AVERAGE\_I\_BIT(n-2) * FLT + BIT(n-1) * (1 - FLT) \quad (6)$$

where FLT denotes an adjustment value set in a range $0 \leq FLT < 1$, and a value of about 0.2 is an appropriate value for the adjustment value FLT. The target code quantity determining circuit 47 thus obtains the average generated code quantity AVERAGE I BIT(n) of the nth I-picture by subjecting the average generated code quantities AVERAGE I BIT(n−2) and AVERAGE I BIT(n−1) of two immediately preceding I-pictures to weighting addition using the adjustment value FLT. When the adjustment value FLT is brought closer to a value of zero, the average generated code quantity AVERAGE I BIT of the I-picture becomes an instantaneous rate for a short time. When the adjustment value FLT is brought closer to a value of one, the average generated code quantity AVERAGE I BIT of the I-picture becomes an average rate for a long time. Incidentally, an initial value AVERAGE I BIT(0) associated with the average generated code quantity AVERAGE I BIT of the I-picture may be determined arbitrarily. When the adjustment value FLT is not the value of one, the adjustment value FLT may be set to the value of zero. The target code quantity determining circuit 47 similarly obtains the average generated code quantities AVERAGE P BIT and AVERAGE B BIT of the P-picture and the B-picture, setting the adjustment value FLT, and sets the coefficient LRB(n).

The target code quantity determining circuit 47 thus sets the adjustment value FLT on the basis of a result of monitoring the generated code quantity, and sets the coefficient LRB (n) indicating a degree of image quality improvement. Further, the target code quantity determining circuit 47 calculates the target code quantity VBR TARGET(n) of the picture to be coded using the coefficient LRB(n).

In addition, the target code quantity determining circuit 47 calculates the CBR target code quantity CBR TARGET X(n) of an X picture by the arithmetic processing of the following equation, where the X picture is an I-picture, a P-picture, or a B-picture.

$$CBR\_TARGET\_X(n) = (GOP\_SIZE * TRUE\_PRED\_X(n)) / (I\_NUM * TRUE\_PRED\_I(n) + P\_NUM * TRUE\_PRED\_P(n) + B\_NUM * TRUE\_PRED\_B(n)) \quad (7)$$

where the true predicted code quantities TRUE PRED I(n), TRUE PRED P(n), and TRUE PRED B(n) are predicted code quantities when the nth picture is encoded as an I-picture, a P-picture, and a B-picture. The true predicted code quantities when the picture to be encoded is assumed to be encoded as other picture types which quantities are obtained in addition when the true predicted code quantity of the picture to be encoded is obtained as described above by Equation (2) are applied. GOP SIZE is the code quantity of one GOP set by the CBR, and is obtained by arithmetic processing to be described later.

The target code quantity determining circuit 47 thus allots the code quantities generated when the picture to be encoded is encoded as an I-picture, a P-picture, and a B-picture, and assigns the code quantity indicated by GOP SIZE to the picture to be encoded. The target code quantity determining circuit 47 thereby calculates the CBR target code quantity CBR TARGET X(n).

The code quantity GOP SIZE is obtained by the following equation using an upper limit rate LIMIT RATE associated with switching between the VBR and the CBR, a number of GOPs per unit time M, and an offset value OFFSET.

$$GOP\_SIZE(n) = LIMIT\_RATE/M + OFFSET \quad (8)$$

The number of GOPs per unit time M is obtained by dividing the number of frames (frame rate) per second PICTURE RATE in the encoder 14 by a total number obtained by summing the numbers I NUM, P NUM, and B NUM of pictures forming one GOP, as represented by the following equation.

$$M = PICTURE\_RATE/(I\_NUM + P\_NUM + B\_NUM) \quad (9)$$

The offset value OFFSET is obtained by the following equation using the instantaneous rate INSTANT RATE(n) of the nth picture and the number of GOPs per unit time M.

$$OFFSET = (LIMIT\_RATE - INSTANT\_RATE(n))/M \quad (10)$$

Thus, the target code quantity determining circuit 47 allots the code quantities generated when the picture to be encoded is encoded as an I-picture, a P-picture, and a B-picture, and thereby sets the CBR target code quantity CBR TARGET X(n) of the picture to be encoded so that ripples of the instantaneous rate are prevented.

Figure 5:
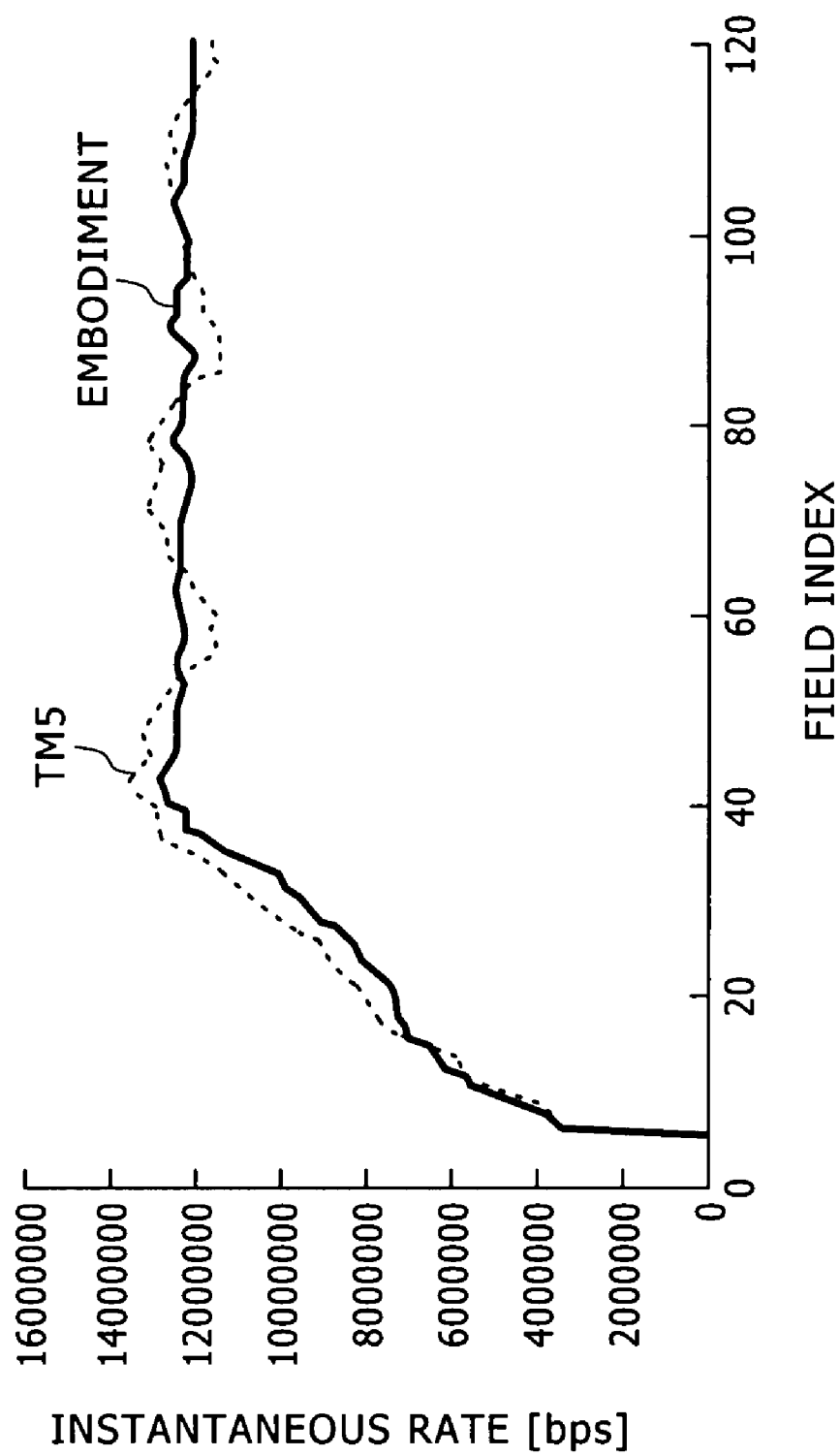
FIG. 5 is a characteristic curve diagram showing a generated code quantity by the encoder of FIG. 3.
Figure 6:
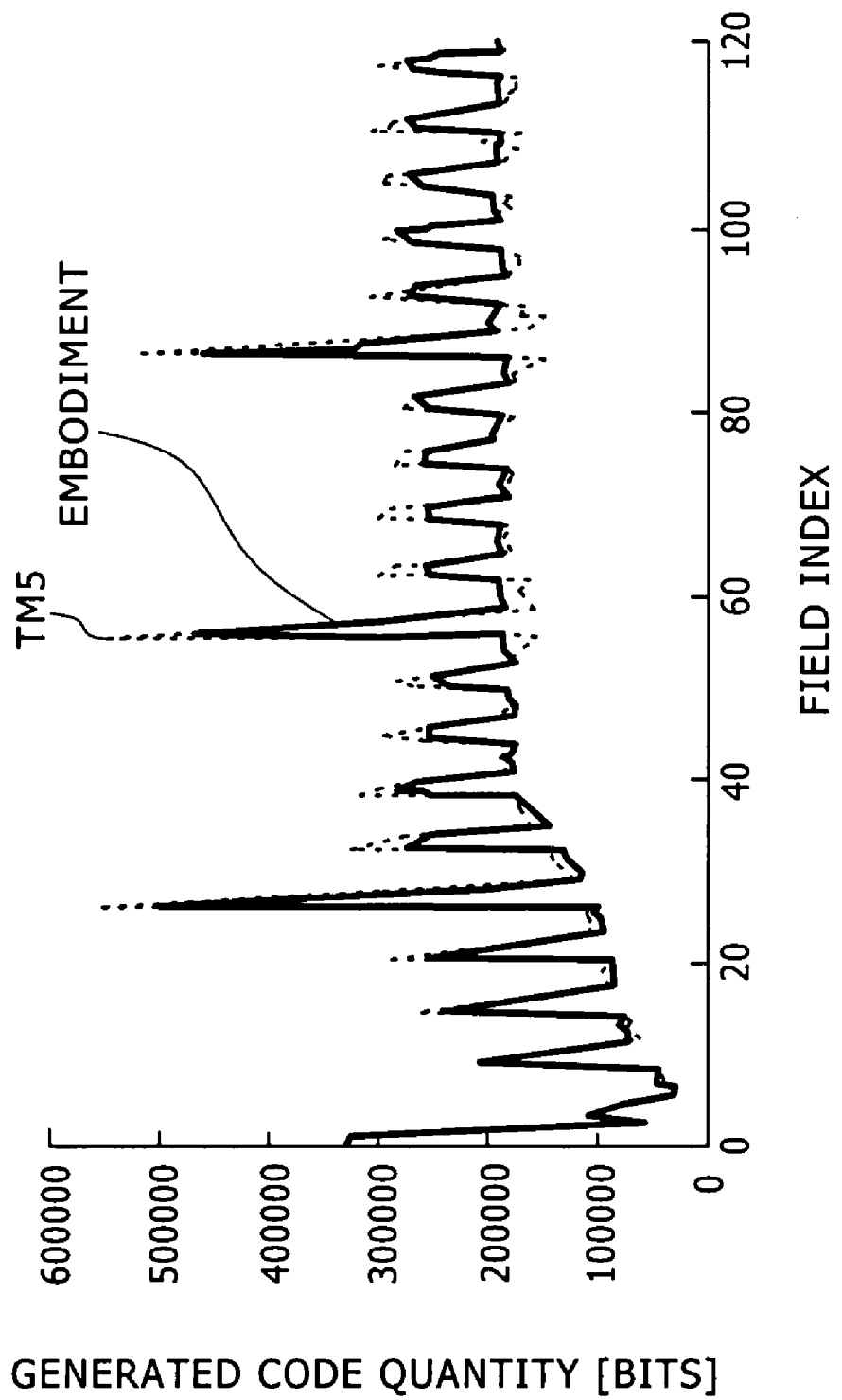
FIG. 6 is a characteristic curve diagram showing ripples of the generated code quantity by the encoder of FIG. 3.

Specifically, FIG. 5 shows that while in encoding control in TM (Test Mode) 5, a ripple of the instantaneous rate is observed in a GOP period when the instantaneous rate is increased and CBR encoding control is performed, such a ripple is suppressed and variations in the instantaneous rate are small when the CBR target code quantity CBR TARGET X(n) is set in the present embodiment. FIG. 6 shows a CBR generated code quantity, and indicates that in TM5, the generated code quantity has large ripples, and the generated code quantity of a P-picture immediately succeeding an I-picture, in particular, is extremely decreased. It is indicated, however, that the present embodiment suppresses ripples of the generated code quantity as compared with TM5, and that an appropriate code quantity is thus allocated to each picture.

The target code quantity determining circuit 47 selects a target code quantity on a smaller value side from the VBR target code quantity VBR TARGET(n) and the CBR target code quantity CBR TARGET(n) thus obtained, as expressed by the following equation. The target code quantity determining circuit 47 sets the target code quantity as a final target code quantity TARGET(n) (indicated by reference numeral 61 in FIG. 4).

When VBR_TARGET(n)<CBR_TARGET(n)

TARGET(n)=VBR_TARGET(n)

When VBR_TARGET(n)<CBR_TARGET(n)

TARGET(n)=CBR_TARGET(n)  (11)

As described above with reference to FIG. 2, the encoder 14 switches between VBR encoding control and CBR encoding control at the upper limit rate LIMIT RATE.

The encoding control circuit 31 controls the quantization scale of the quantizing circuit 35 by a method of step 2 of TM5 such that a generated code quantity becomes the thus determined target code quantity TARGET(n). Specifically, the encoding control circuit 31 defines a virtual buffer for each picture type, and updates contents of the virtual buffer by the arithmetic processing of the following equation each time one macroblock is encoded, to update the quantization scale.

$$di = d0i + Bj-1 - Ti(j-1)/MB\_Count \quad (12)$$

$$dp = d0p + Bj-1 - Tp(j-1)/MB\_Count \quad (13)$$

$$db = d0b + Bj-1 - Tb(j-1)/MB\_Count \quad (14)$$

where di, dp, and db are the capacities of the virtual buffers for the I-picture, the P-picture, and the B-picture, respectively; d0i, d0p, and d0b are the initial values of the respective virtual buffers; Bj−1 is a generated code quantity up to a (j−1)th macroblock; Ti, Tp, and Tb are the target code quantities of the respective pictures, and the target code quantities TARGET(n) of the respective pictures are substituted for Ti, Tp, and Tb; MB Count is the number of macroblocks in the picture.

The capacities di, dp, and db of the virtual buffers are each converted into a quantization scale by the following equation.

$$Qj = dj*51/r \qquad (15)$$

where the capacities di, dp, and db of the virtual buffers are substituted for dj according to the picture type, and r is a reaction parameter, which is expressed by the following equation. Incidentally, as employed in step 3 of TM5, the quantization scale may be locally changed according to a picture pattern as required.

$$r = 2*bit\_rate/picture\_rate \qquad (16)$$

The encoding control circuit 31 sets the quantization scale Qj thus obtained in the quantizing circuit 35 to quantize the coefficient data output from the discrete cosine transform circuit 34. Incidentally, as described above, the encoding control circuit 31 controls the operation of the quantizing circuit 35 so as to encode each macroblock by the initially set fixed quantization scale QP INIT for a picture at a start of a sequence of each picture type.

Thus, it may be considered that the correction coefficient ADJUST(n) described above with reference to Equation (2) can be obtained by a comparison between the generated code quantity BIT(n) (indicated by reference numeral 62 in FIG. 4) of the nth picture obtained by the thus set quantization scale and the corresponding true predicted code quantity TRUE PRED(n). It may also be considered that a generated code quantity can be predicted with a high accuracy using the correction coefficient ADJUST(n) of the nth picture for the predicted code quantity TRUE PRED(n+1) of a following picture.

However, regarding the generated code quantity BIT(n) detected in this case, the encoding process is performed on the basis of the setting of the quantization scale determined by Equations (12) to (16) and thus the process is performed by the quantization scale different from the fixed quantization scale QP INIT as a premise for the encoding process. Thus, when simply comparing the generated code quantity BIT(n) with the corresponding true predicted code quantity TRUE PRED(n), it is difficult to obtain a correct correction coefficient ADJUST(n), and it is therefore impossible to predict the generated code quantity with a high accuracy.

The generated code quantity predicting circuit 46 therefore corrects the true generated code quantity TRUE PRED(n) to a generated code quantity predicted when the quantization scale of the quantizing circuit 35 is set to a certain reference quantization scale. In the present embodiment, the fixed quantization scale QP INIT at the sequence start is applied to the certain reference quantization scale. Specifically, the generated code quantity predicting circuit 46 converts the detected generated code quantity BIT(n) to a generated code quantity BIT BY CONSTQ PRED(n) obtained on the basis of the certain quantization scale QP CONSTQ (QP INIT) by the arithmetic processing of the following equation.

$$BIT\_BY\_CONSTQ\_PRED(n) = e\^{(k*(QP\_CONSTQ-QP\_AVERAGE(n)))}*BIT(n) \qquad (17)$$

where e is a natural logarithm, k is an adjustment value, and QP AVERAGE(n) is an average value within a frame of the quantization scale actually used in encoding. Incidentally, k can be obtained from several sequences on an experimental basis, and is preferably set to −0.115<k<−0.110 so that the generated code quantity can be predicted with a practically sufficient accuracy. More preferably, a sufficient accuracy can be ensured with k=−0.1126.

The generated code quantity predicting circuit 46 obtains a correction coefficient ADJUST(n+1) for a subsequent (n+1) th picture of the same picture type by performing the arithmetic processing of the following equation using the generated code quantity BIT BY CONSTQ PRED(n) obtained by Equation (17) on the basis of the certain quantization scale QP CONSTQ (QP INIT). The above-described arithmetic process is thereafter repeated for the subsequent (n+1)th picture.

$$ADJUST(n+1) = BIT\_BY\_CONSTQ\_PRED(n)/ROUGH\ PRED(n) \qquad (18)$$

It is to be noted that the calculation of the correction coefficient ADJUST(n+1) by Equation (18) is applied to interframe predicted P-pictures and B-pictures, but is not applied to I-pictures subjected to only intra-frame prediction because the roughly calculated predicted code quantity ROUGH PRED(n) obtained by Equation (1) has a strong correlation with the actually generated code quantity BIT (n). That is, a fixed value of one is applied as the correction coefficient ADJUST(n+1) to an I-picture, and thus the roughly calculated predicted code quantity ROUGH PRED(n) is applied to the true predicted code quantity TRUE PRED(n) as described above.

Figure 7:
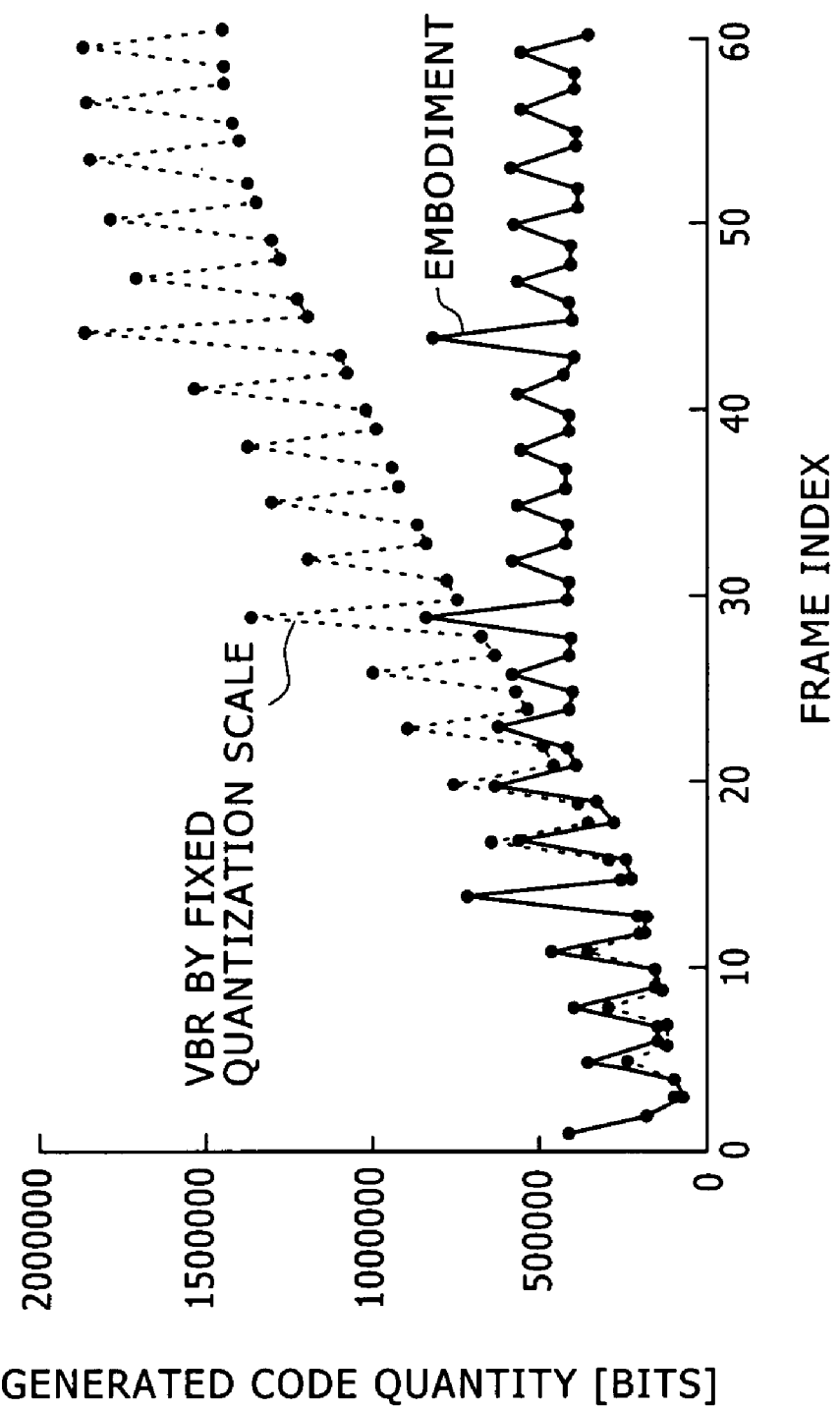
FIG. 7 is a characteristic curve diagram showing changes in the generated code quantity by the encoder of FIG. 3.
Figure 8:
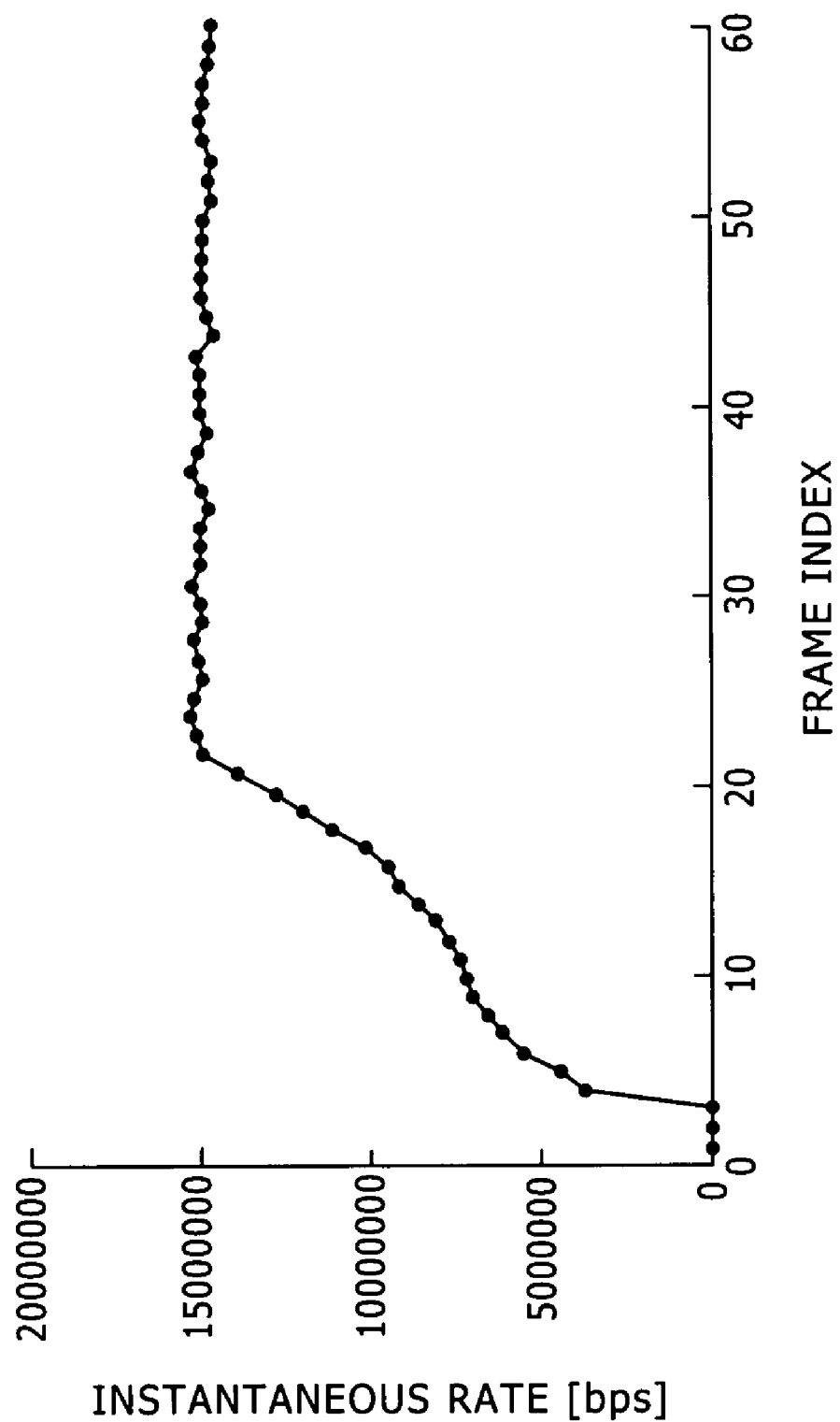
FIG. 8 is a characteristic curve diagram showing changes in the generated code quantity as a result of switching between a VBR and a CBR by the encoder of FIG. 3.

FIG. 7 and FIG. 8 are characteristic curve diagrams showing a process result when a moving image that gradually increases in generated code quantity with the progress of frames is subjected to the encoding process. Incidentally, for the fixed quantization scale QP INIT at a sequence start, I, P=31/B=33 was selected. The upper limit rate LIMIT RATE associated with switching between the CBR and the VBR was set to 15 [Mbps], and the threshold rate LRB END RATE associated with image quality improvement was set to 9 [Mbps]. This characteristic curve diagram shows that while simply performing encoding control by a fixed quantization scale gradually increases the generated code quantity, the encoder 14 according to the present embodiment limits the generated code quantity from the vicinity of a 20th frame. In addition, in a range from a sequence start to a 10th frame, the generated code quantity in the present embodiment is larger than when encoding control is performed by the fixed quantization scale, and thus the effect of image quality improvement as described above with reference to FIG. 2 can be confirmed. The characteristic curve diagram of FIG. 8 also shows that the effect of such image quality improvement is ended around 9 [Mbps] and that the rate is thereafter constant at 15 [Mbps].

Thus, the encoder 14 can limit the instantaneous bit rate of encoded data by setting the upper limit rate LIMIT RATE associated with switching between the CBR and the VBR, and can change the recordable time of the recording medium 2 by changing the upper limit rate LIMIT RATE.

The fixed quantization scale QP INIT set at a start of a sequence of each picture type is a prediction reference for predicting the generated code quantity of a subsequent picture as described above with reference to Equation (1). The average generated code quantity of encoded data can be varied by the setting of the fixed quantization scale QP INIT.

Figure 9:
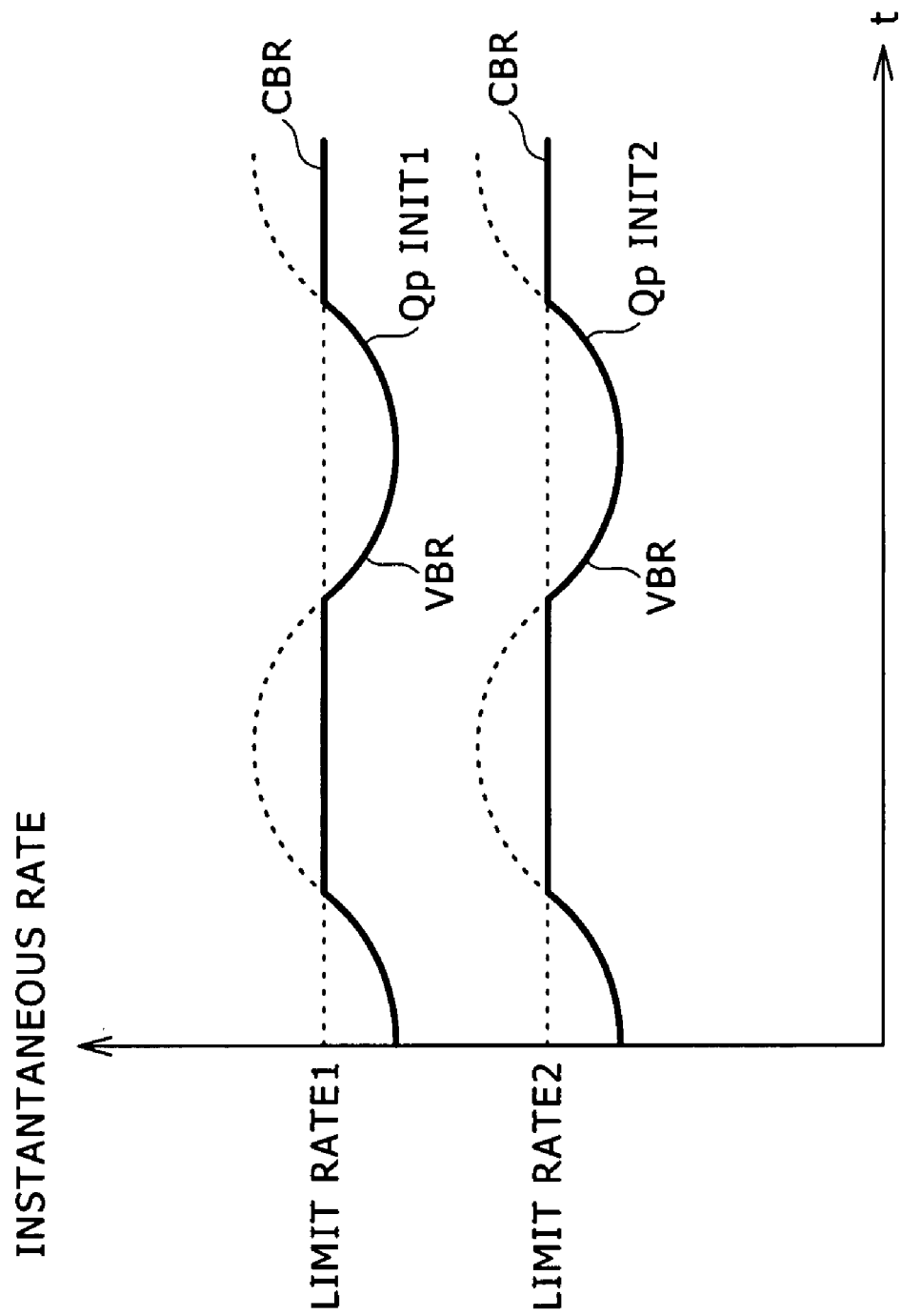
FIG. 9 is a characteristic curve diagram of assistance in explaining the switching of an operation mode in the encoder of FIG. 3.

The controlling unit 5 in the present embodiment switches an operation mode between a long-time recording mode and a standard-time recording mode by changing the upper limit rate LIMIT RATE and the fixed quantization scale QP INIT in such a manner as to interlock the upper limit rate LIMIT RATE and the fixed quantization scale QP INIT with each other, as shown in FIG. 9.

(2) Operation of Embodiment 1

In the digital video camera 1 (FIG. 1) having the above configuration, the camera unit 3 obtains image data as a result of image pickup. The camera DSP 12 subjects the image data to processing such as white balance adjustment and the like. Then the encoder 14 subjects the image data to an encoding process. The encoded data as a result of the encoding process is recorded onto the recording medium 2 via the controlling unit 5. Thereby the result of picking up an image of a desired subject is recorded onto the recording medium 2.

A picture type is sequentially set to the image data D1 in the encoder 14 (FIG. 3). Difference data between the image data D1 and predicted image data is subjected to a discrete cosine transform process by the discrete cosine transform circuit 34. Coefficient data as a result of the process is subjected to a quantizing process by the quantizing circuit 35, and then subjected to a lossless coding process by the lossless coding circuit 36, whereby encoded data is generated. Further, the input image data D1 is decoded by the dequantizing circuit 37, the inverse discrete cosine transform circuit 38, and the deblocking filter 39, and then stored in the frame memory 40. In the encoder 14, the intra prediction circuit 11 and the inter prediction circuit 12 detect an optimum intra prediction mode and an optimum inter prediction mode from a large number of prediction modes using the image data as a decoding result which data is stored in the frame memory 40. Further, from these prediction modes, the mode determining circuit 33 in a subsequent stage detects an optimum prediction mode according to the picture type. Predicted image data in the optimum prediction mode is input to the subtracting circuit 32.

In parallel with such an encoding process, the encoding control circuit 31 predicts the generated code quantity of each picture of the input image data D1 in advance, and controls the quantization scale of the quantizing circuit 35 according to a result of the prediction, whereby the generated code quantity is controlled to guarantee a recording time for recording onto the recording medium 2.

Thus, the encoder 14 selects an optimum prediction mode from such a large number of prediction modes, and performs the encoding process. When the generated code quantity is predicted by the conventional one-pass system, the generated code quantity cannot be predicted correctly, thus resulting in inappropriate allocation of a code quantity to each picture, and correspondingly degrading picture quality.

In the encoder 14, the intra prediction circuit 41 and the simple inter prediction circuit 44 corresponding to the intra prediction circuit 11 and the inter prediction circuit 12, respectively, generate pseudo predicted image data exhibiting a similar tendency to that of proper predicted image data by a simple process. The subtracting circuits 42 and 45 generate prediction residual data between the pseudo predicted image data and the input image data D1. The generated code quantity predicting circuit 46 (FIG. 4) cumulatively adds the prediction residual data in each picture, and thereby detects the residual data BD(n) of each picture. The encoder 14 thus detects a feature quantity indicating a degree of difficulty of encoding.

The encoder 14 performs the encoding process by the fixed quantization scale QP INIT at least at a start of a sequence of each picture type. With an actual generated code quantity BIT(0) in this picture as a reference, from a ratio between a feature quantity BD(0) in this picture and a feature quantity BD(n) detected in a picture to be encoded, the roughly calculated predicted code quantity ROUGH PRED(n) of the picture to be encoded is obtained (Equation (1)).

The roughly calculated predicted code quantity ROUGH PRED(n) thus obtained lacks in accuracy. A roughly calculated predicted code quantity ROUGH PRED(n) to which a feature quantity based on a high-frequency component, for example, is applied by other than such a method also lacks in accuracy.

Therefore the encoder 14 corrects the roughly calculated predicted code quantity ROUGH PRED(n) thus obtained by a correction coefficient ADJUST(n) corresponding to a picture type (Equation (2)), and thereby obtains a true predicted code quantity TRUE PRED(n). The encoder 14 encodes the input image data on the basis of the true predicted code quantity TRUE PRED(n), and thereby generates encoded data. The correction coefficient ADJUST(n) of the corresponding picture type is generated on the basis of the actual generated code quantity of the encoded data (Equation (18)). It is confirmed that the true predicted code quantity TRUE PRED(n) thus detected coincides with the actual generated code quantity with a considerable accuracy.

Thus, in the present embodiment, since the generated code quantity can be predicted with a high accuracy, it is possible to allocate a code quantity to each picture on the basis of the predicted generated code quantity, and therefore allocate a code quantity to each picture more appropriately than in the conventional method. Thus, even when a recording time is to be guaranteed by the one-pass system, and even when there are many prediction modes, it is possible to allocate an appropriate code quantity to each picture, and thereby improve picture quality.

At this time, a correction coefficient ADJUST(n+1) is set on the basis of a ratio between the roughly calculated predicted code quantity detected in the immediately preceding picture for which the encoding process is completed and the actual generated code quantity of the corresponding encoded data (Equation (18)). Thus, even when a picture change occurs, for example, and the accuracy of the true predicted code quantity TRUE PRED(n) is temporarily decreased, the correction coefficient ADJUST(n+1) is corrected so as to respond to the picture change, so that the accuracy of the true predicted code quantity TRUE PRED(n) can be increased. Thus, even when a picture change occurs due to a scene change or the like, it is possible to allocate an appropriate code quantity to each picture, and thereby improve picture quality.

The encoding process is performed by the fixed quantization scale QP INIT at least at a start of a sequence of each picture type. With an actual generated code quantity BIT(0) in this picture as a reference, from a ratio between a feature quantity in this picture and a feature quantity detected in a picture to be encoded, the roughly calculated predicted code quantity ROUGH PRED(n) of the picture to be encoded is obtained. The roughly calculated predicted code quantity ROUGH PRED(n) is corrected to thereby obtain a true predicted code quantity TRUE PRED(n). Thus, with the fixed quantization scale QP INIT as a basis, the encoder 14 performs the encoding process while controlling the quantization scale on the basis of a relative change of the feature quantity BD(n), detected in the picture to be encoded, to the feature quantity BD(0) associated with the fixed quantization scale QP INIT.

Thus a code quantity substantially equal to a code quantity when encoding is performed by the fixed quantization scale can be predicted with a high accuracy before the encoding of a picture.

By setting the fixed quantization scale QP INIT according to a desired picture quality, it is possible to set various average generated code quantities and thus set various picture qualities by the simple setting. That is, by changing the mode of recording onto the recording medium 2 in the encoder 14, the controlling unit 5 changes the quantization scale QP INIT associated with a start of a sequence of each picture type, and thereby changes picture quality according to the recording mode (FIG. 9).

Determining VBR target code quantity VBR TARGET(n), obtained from the true predicted code quantity TRUE PRED(n), with the CBR target code quantity CBR TARGET(n) obtained from the upper limit rate LIMIT RATE (Equation (11)), the encoder 14 estimates the true predicted code quantity TRUE PRED(n) with the upper limit rate LIMIT RATE as a fixed value. When the true predicted code quantity TRUE PRED(n) is smaller than the upper limit rate LIMIT RATE, the encoder 14 sets the true predicted code quantity TRUE PRED(n) as a target code quantity TARGET(n), and thus performs a VBR encoding process. When the true predicted code quantity TRUE PRED(n) is larger than the upper limit rate LIMIT RATE, the encoder 14 sets a code quantity corresponding to the upper limit rate LIMIT RATE as the target code quantity, and thus performs a CBR encoding process. The quantization scale is set by the process of step 2 of TM5 such that a generated code quantity becomes the target code quantity, and the input image data is encoded (Equations (12) to (16)). Thereby, the encoder 14 improves encoding efficiency by the VBR encoding process when the generated code quantity is small, while guaranteeing the recordable time of the recording medium 2 by the CBR encoding process.

Since switching between the VBR encoding and the CBR encoding is thus performed according to the true predicted code quantity, and accuracy in prediction of the true predicted code quantity is improved, the switching between the VBR encoding and the CBR encoding can be performed smoothly and instantaneously, whereby occurrence of a sense of incongruity at the time of such switching can be prevented.

Switching between VBR encoding control and CBR encoding control is thus performed, and the upper limit rate LIMIT RATE is changed by the controlling unit 5 according to the recording mode, whereby the rate of encoded data is changed according to the recording mode (FIG. 9). At this time, the fixed quantization scale QP INIT associated with a sequence start is changed in such a manner as to be interlocked with the changing of the upper limit rate LIMIT RATE. Thereby an average generated code quantity can be changed so as to respond to the change in the rate of the encoded data. Thus, VBR pictures and CBR pictures can be changed in picture quality substantially equally in response to the changing of the operation mode, so that a sense of incongruity caused by the changing of the operation mode can be eliminated.

When the generated code quantity is thus predicted and the encoded data is generated by the VBR encoding process, and when the quantization scale of the quantizing circuit 35 is set such that the generated code quantity becomes a target code quantity and the encoding process is performed, the encoding process is performed by a quantization scale different from the fixed quantization scale as a reference for predicting the generated code quantity. In this case, a true generated code quantity obtained by correcting a roughly calculated predicted generated code quantity by a correction coefficient obtained on the basis of an actual generated code quantity lacks in accuracy.

The encoder 14 therefore corrects the true generated code quantity TRUE PRED(n) to a generated code quantity predicted when the quantization scale of the quantizing circuit 35 is set to a fixed quantization scale at a sequence start as a certain reference quantization scale. More specifically, the actual generated code quantity is converted by the arithmetic processing of Equation (17) to a generated code quantity obtained when the quantization scale for the encoding process is set to the fixed quantization scale at the sequence start. The correction coefficient of a corresponding picture type is generated on the basis of the converted generated code quantity.

Thus, even under a state of rate control, the encoder 14 normally produces a generated code quantity equal to that produced when encoding is performed by the fixed quantization scale. It is therefore possible to set an appropriate code quantity to each picture, and thereby improve picture quality. In addition, such a correction is performed in a process of feedback for the setting of the correction coefficient ADJUST(n), so that the process can be simplified accordingly.

Switching between the VBR and the CBR is performed and the encoding process is performed while thus predicting the generated code quantity. In CBR encoding control, when the target code quantity of each picture is set by a conventional method such as TM5 applied to MPEG-2, for example, ripples, or so-called fluctuations in the generated code quantity become large (FIG. 5). Specifically, while calculating a remaining allocated code quantity by subtracting the generated code quantity of one picture from the allocated code quantity of one GOP, the method of TM5 sequentially allocates the remaining allocated code quantity to remaining pictures. The method of TM5 tends to cause ripples or fluctuations of bits occurring at GOP boundaries, and cannot allocate an appropriate code quantity to each picture when a degree of difficulty changes within the GOP.

Therefore, in addition to a roughly calculated predicted code quantity for a corresponding picture type, the encoder 14 also obtains roughly calculated predicted code quantities for other picture types when a picture to be encoded is encoded as the other picture types. Further, true predicted code quantities for the other picture types are also obtained on the basis of the roughly calculated predicted code quantities for the other picture types. Further, the instantaneous rate of a sequence is measured at each picture in the sequence on the basis of a true predicted code quantity for the corresponding picture type and the true predicted code quantities for the other picture types (Equation (6)). An allocatable code quantity is allotted using the instantaneous rate, and a target code quantity is set (Equations (7) to (10)).

More specifically, on an assumption that the true predicted code quantity for the corresponding picture type and the true predicted code quantities for the other picture types are the generated code quantity of each picture in one GOP, an allocatable code quantity is allotted, and a target code quantity is set.

Thus, even when a degree of difficulty is changed in the GOP, a target code quantity can be allotted by optimum allocation at the time of setting the target code quantity to each picture in response to the change. Thereby a more appropriate code quantity can be allocated to each picture. It is thus possible to prevent ripples or fluctuations in the generated code quantity and thereby improve picture quality.

On the other hand, in the VBR encoding process, when the encoding process is simply performed by the fixed quantization scale, degradation in picture quality is noticeable in a sequence with a low degree of difficulty. Incidentally, when the quantization scale is adjusted centering on such a sequence with a low degree of difficulty in order to avoid such degradation in picture quality, it is difficult to guarantee the recording time when sequences with a high degree of difficulty occur consecutively. Therefore the encoder 14 measures the instantaneous rate of a sequence at each picture in the sequence (Equation (5)), and thereby grasps an instantaneous degree of difficulty of the sequence. In the case of a sequence with a low degree of difficulty and a low instantaneous rate, the compression ratio is lowered intentionally (Equations (3) and (4)). Thereby degradation in picture quality in a sequence with such a low degree of difficulty is prevented.

Specifically, when a true predicted code quantity is smaller than a reference value for picture quality improvement smaller than a fixed value associated with switching to the CBR, the true predicted code quantity is increased by a coefficient that increases as the true predicted code quantity is decreased, and then a target code quantity is set. Thereby degradation in picture quality in a sequence with a low degree of difficulty is prevented.

Further, by limiting this coefficient that thus increases to prevent degradation in picture quality to a certain value, it is possible to reduce the generated code quantity and thereby reduce unnecessary consumption of a recording space when picture taking is accidentally started with a lens cap on, for example.

(3) Effects of Embodiment 1

According to the above configuration, a true predicted code quantity is calculated by correcting a roughly calculated predicted code quantity predicted from input image data by a correction coefficient. The input image data is encoded on the basis of the true predicted code quantity. The correction coefficient of a corresponding picture type is set on the basis of an actual generated code quantity. Thus, even when a recording time is to be guaranteed by the one-pass system, and even when there are many prediction modes, it is possible to allocate an appropriate code quantity to each picture.

At this time, the correction coefficient is set on the basis of a ratio between a roughly calculated predicted code quantity detected in a picture for which the encoding process is completed and the actual generated code quantity of corresponding encoded data. Thus, even when a picture change occurs due to a scene change or the like, it is possible to allocate an appropriate code quantity to each picture, and thereby improve picture quality.

The input image data of at least a picture at a start of a sequence of each picture type is encoded by a fixed quantization scale set in advance. With an actual generated code quantity obtained by the fixed quantization scale as a reference, the roughly calculated predicted code quantity of a picture to be encoded is calculated from a ratio between a feature quantity indicating a degree of difficulty of encoding, which quantity is detected in the picture at the sequence start, and a feature quantity detected in the picture to be encoded. Thus, with the generated code quantity obtained by the fixed quantization scale as a reference, it is possible to predict the generated code quantity with high accuracy, and thus allocate an appropriate code quantity.

Then the encoding process is performed with a target code quantity set on the basis of the true predicted code quantity and the quantization scale set such that the actual generated code quantity becomes the target code quantity. When the true predicted code quantity is smaller than a certain value, the true predicted code quantity is set as the target code quantity. When the true predicted code quantity is larger than the certain value, a code quantity corresponding to the certain value is set as the target code quantity. It is thereby possible to guarantee the recordable time for which recording onto the recording medium 2 can be performed, and improve encoding efficiency.

In addition, by changing the fixed quantization scale associated with each sequence start in response to an operation by a user, it is possible to change the average generated code quantity of encoded data, and thereby record a result of image pickup with a desired picture quality.

In addition, a fixed value associated with switching between VBR encoding control and CBR encoding control is changed in such a manner as to be interlocked with the changing of the fixed quantization scale, whereby the average generated code quantity can be changed and picture quality can be changed in such a manner as to be interlocked with the changing of the recordable time.

The encoding process is performed with the target code quantity set on the basis of the true predicted code quantity and the quantization scale set such that the actual generated code quantity becomes the target code quantity. By correcting the true generated code quantity to a generated code quantity predicted when the quantization scale is set to a certain reference quantization scale, it is possible to obtain a CBR generated code quantity with high accuracy even when a VBR encoding process is performed, and thereby allocate an appropriate code quantity to each picture.

Specifically, an actual generated code quantity is converted to a generated code quantity when the quantization scale in the encoding step is set to the fixed quantization scale at a sequence start. The correction coefficient is generated on the basis of the converted generated code quantity. Thereby the true predicted code quantity can also be corrected in a process of feedback for the setting of the correction coefficient, so that the process can be simplified accordingly.

More specifically, the generated code quantity is converted by the arithmetic processing of Equation (17), so that the generated code quantity can be predicted with high accuracy. Further, the coefficient k in Equation (17) is set such that $-0.115 < k < -0.110$, so that the generated code quantity can be predicted with a practically sufficient accuracy. More preferably, a sufficient accuracy can be ensured with $k = -0.1126$.

Roughly calculated predicted code quantities and true predicted code quantities for other picture types when the encoding process is performed for the other picture types are also obtained. An allocatable code quantity is allotted on the basis of a true predicted code quantity for a corresponding picture type and the true predicted code quantities for the other picture types, and a target code quantity is set. It is thus possible to effectively avoid ripples or fluctuations in the generated code quantity and accordingly improve picture quality.

Specifically, on an assumption that the true predicted code quantity for the corresponding picture type and the true predicted code quantities for the other picture types are the generated code quantity of each picture in one GOP, an allocatable code quantity is allotted, and a target code quantity is set. It is thus possible to effectively avoid ripples or fluctuations in the generated code quantity and accordingly improve picture quality.

When the true predicted code quantity is smaller than a reference value for picture quality improvement smaller than a fixed value associated with switching between the VBR and the CBR, the true predicted code quantity is increased by a coefficient that increases as the true predicted code quantity is decreased, and the increased true predicted code quantity is set as a target code quantity. Thereby degradation in picture quality when a degree of difficulty of encoding is low is made less noticeable.

Further, at this time, by limiting this coefficient that thus increases to a certain value, it is possible to prevent an unnecessary consumption on the recording medium when the degree of difficulty of encoding is significantly low.

(4) Embodiment 2

Figure 10:
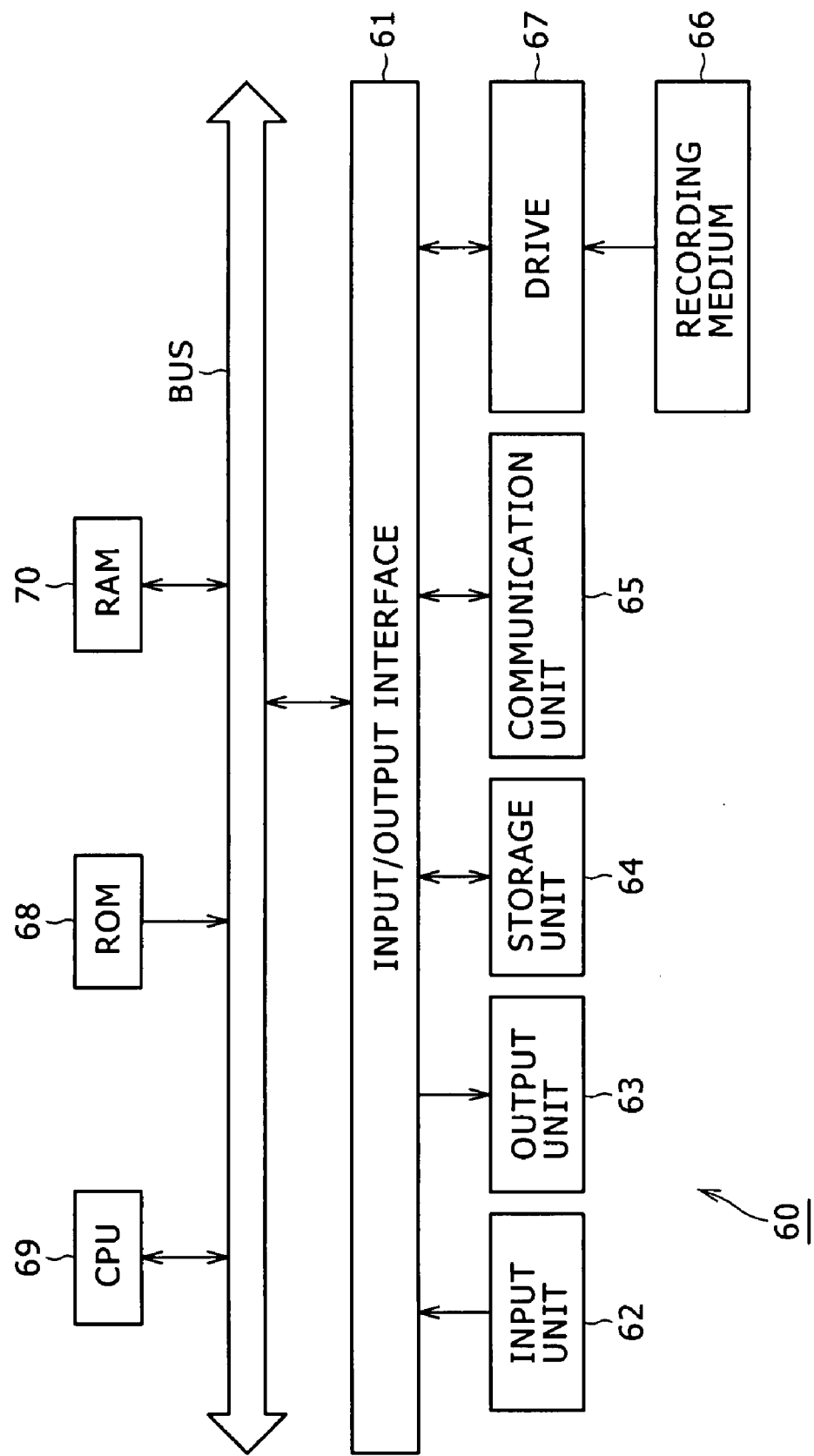
FIG. 10 is a block diagram showing a personal computer according to an embodiment 2 of the present invention.

FIG. 10 is a block diagram showing a personal computer according to an embodiment 2 of the present invention. In the embodiment 2, image data is encoded by processing in the personal computer 60.

Specifically, a bus BUS in the personal computer 60 is connected with various input-output interfaces via an input-output interface 61. The input-output interfaces are formed by for example an input unit 62 including a keyboard, a mouse and the like, an output unit 63 including a display device, a speaker and the like, a storage unit 64 including a hard disk device and the like, a communication unit 65 including a modem and the like, a drive 67 for recording and reproduction on a recording medium 66 such as an optical disk, a magnetic disk, or the like.

The personal computer 60 starts the operation of the whole of the personal computer 60 by a central processing unit 69 on the basis of a recording in a read-only memory (ROM) 68, secures a work area in a random access memory (RAM) 70, and executes various application programs recorded in the storage unit 64 by the central processing unit (CPU) 69, whereby a desired process is performed. One of the application programs provided in the personal computer 60 is an application program for recording and reproducing image data on an optical disk. An encoding process program for implementing the encoder 14 described above in the embodiment 1 by software is provided as an encoding process program for an encoding process at a time of recording in the application program. The embodiment 2 is formed in the same manner as the encoder 14 described above in the embodiment 1 except that the embodiment 2 encodes image data by executing the encoding process program.

Figure 11:
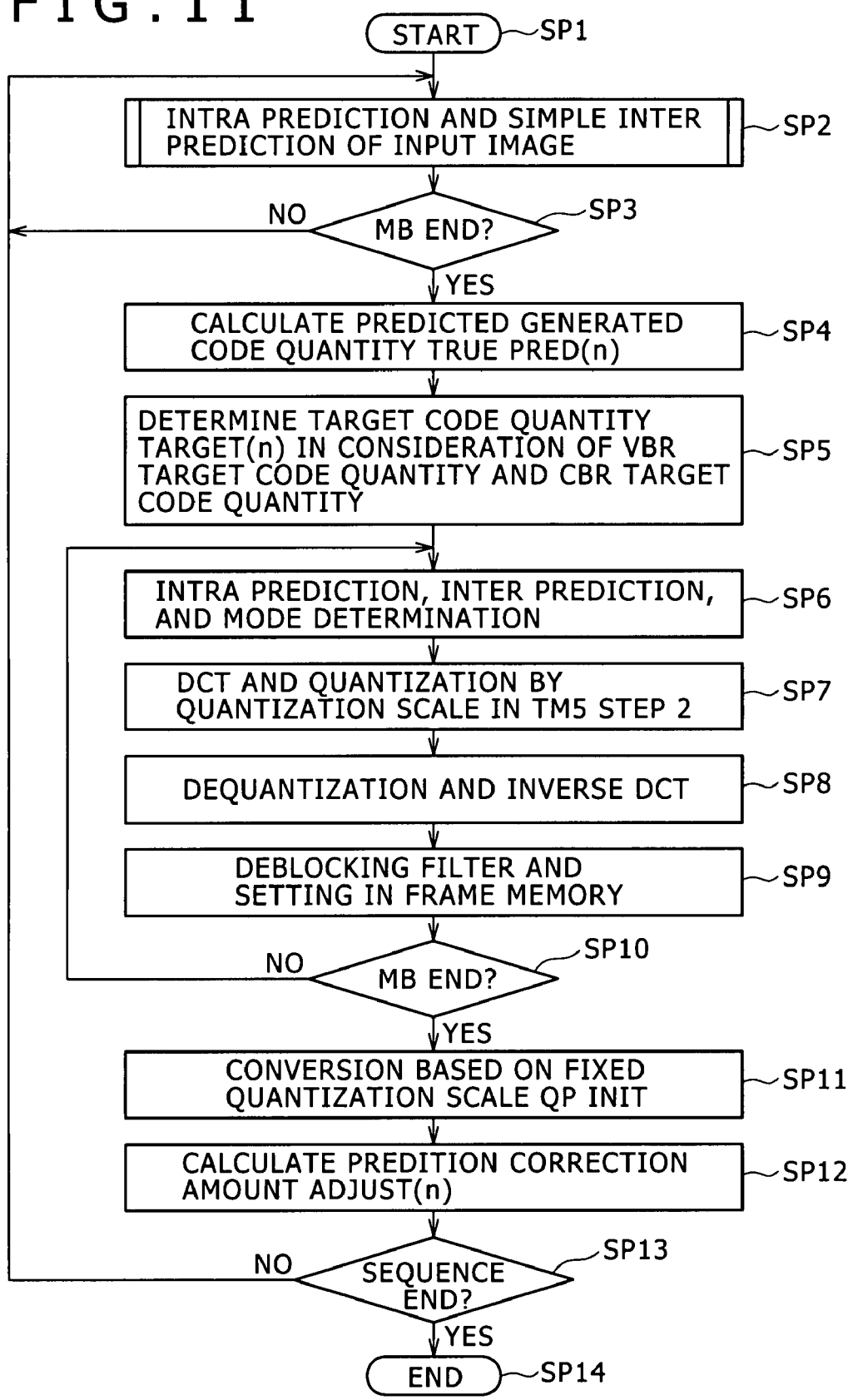
FIG. 11 is a flowchart representing the process procedure of a central processing unit in the personal computer of FIG. 10.

FIG. 11 is a flowchart showing a process procedure of the central processing unit 69 which procedure is associated with the encoding process program. When the central processing unit 69 starts this process procedure, the process proceeds from step SP1 to step SP2, where the central processing unit 69 performs intra prediction and simple inter prediction of input image data, and detects prediction residual data output from the subtracting circuits 42 and 45 described above with reference to FIG. 3. In next step SP3, the central processing unit 69 determines whether processing of a last macroblock in the picture is completed. When a negative result is obtained in step SP3, the process returns to step SP2, where the prediction residual data of a next macroblock is detected. When a positive result is obtained in step SP3, on the other hand, the process proceeds from step SP3 to step SP4, where a true generated code quantity is predicted by performing the arithmetic processing of Equations (1) and (2).

In next step SP5, the central processing unit 69 calculates a VBR target code quantity and a CBR target code quantity by performing the arithmetic processing of Equations (3) to (10), and detects a final target code quantity TARGET(n) on the basis of a comparison of these target code quantities as shown by Equation (11).

In next step SP6, the central processing unit 69 detects an optimum prediction mode associated with proper intra prediction and proper inter prediction. In next step SP7, the central processing unit 69 generates prediction residual data associated with a proper encoding process in the optimum prediction mode, obtains coefficient data by subjecting the prediction residual data to a discrete cosine transform process, and generates encoded data by subjecting the coefficient data to a quantizing process and a lossless coding process. In this process, the central processing unit 69 sets a quantization scale for each macroblock by performing the arithmetic processing of Equations (12) to (16) such that an actual generated code quantity is the target code quantity obtained in step SP5, and generates the encoded data.

In next step SP8, the central processing unit 69 decodes the prediction residual data by subjecting the encoded data to a dequantizing process and an inverse discrete cosine transform process. In next step SP9, the central processing unit 69 decodes the image data from the decoded prediction residual data, removes block distortions by a deblocking filter, and temporarily stores the image data in the random access memory 70 or the storage unit 64 as a frame memory.

Next, the central processing unit 69 in step SP10 determines whether the processing of the last macroblock in the picture is completed. When a negative result is obtained in step SP10, the process returns to step SP6 to start the encoding process for a next macroblock. When a positive result is obtained in step SP10, on the other hand, the process proceeds from step SP10 to step SP11, where the central processing unit 69 converts the actual generated code quantity to a generated code quantity obtained on the basis of a fixed quantization scale by performing the arithmetic processing of Equation (17). In next step SP12, a correction coefficient is generated by performing the arithmetic processing of Equation (18) using the converted generated code quantity.

The central processing unit 69 in next step SP13 determines whether the encoding process is completed up to a sequence end. When a negative result is obtained in step SP13, the process returns to step SP2 to start processing a next picture. When a positive result is obtained in step SP13, the process proceeds from step SP13 to step SP14, where the central processing unit 69 ends the process procedure.

Figure 12:
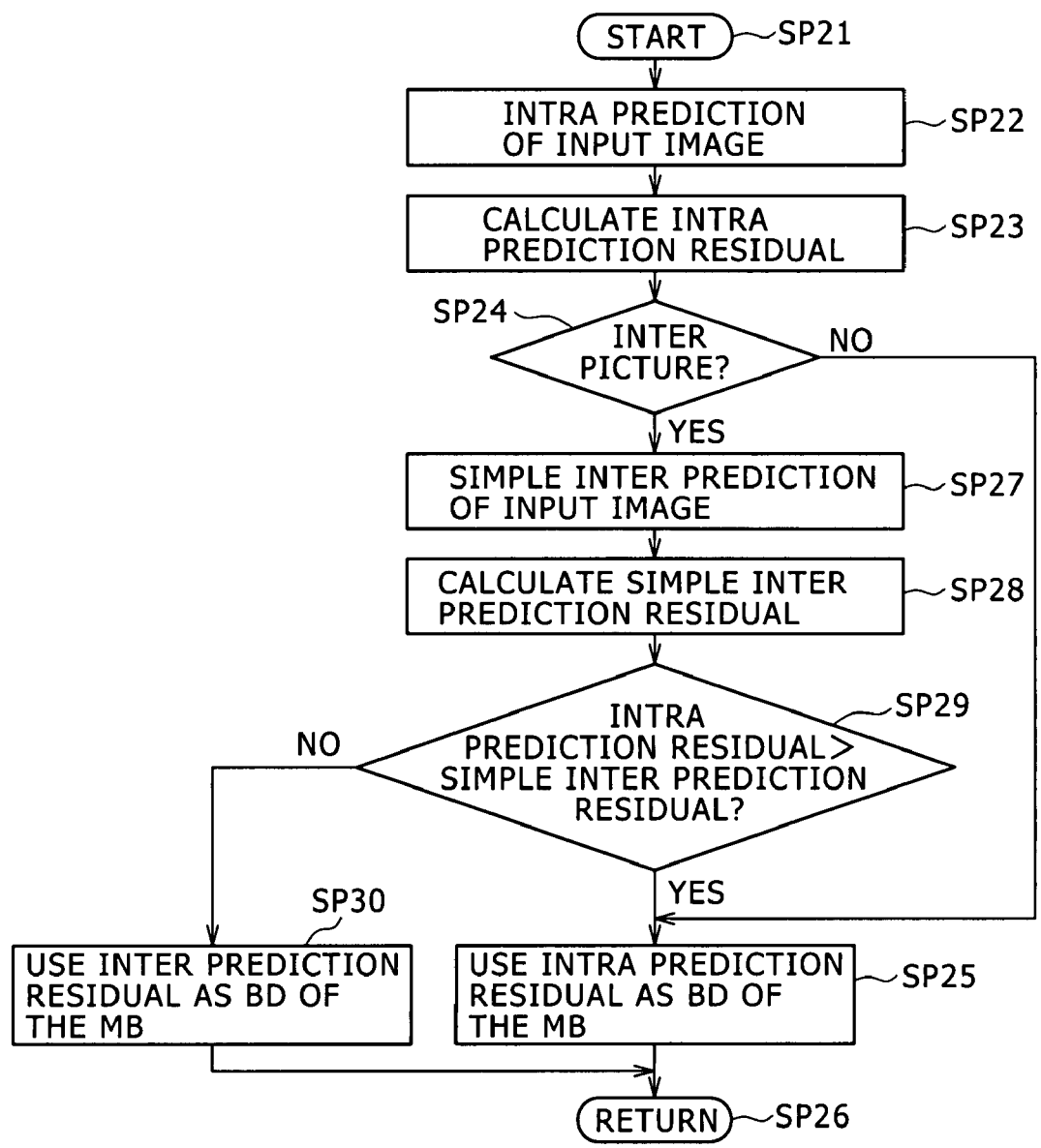
FIG. 12 is a flowchart representing details of a part of the process procedure represented in the flowchart of FIG. 11.

FIG. 12 is a flowchart representing details of the process of step SP2 in the process procedure of FIG. 11. When the personal computer 60 starts this process procedure, the process proceeds from step SP21 to step SP22, where the central processing unit 69 generates predicted image data associated with intra prediction. In next step SP22, the central processing unit 69 calculates prediction residual data associated with the intra prediction using the predicted image data associated with the intra prediction.

In next step SP24, the central processing unit 69 determines whether a picture to be encoded is a B-picture or a P-picture to which inter prediction is applied. When a negative result is obtained in step SP24, the process proceeds from step SP24 to step SP25, where the central processing unit 69 sets a total value of the prediction residual data associated with the intra prediction as residual data BD of the macroblock. The process then proceeds to step SP26 to return to the process procedure.

When a positive result is obtained in step SP24, the process proceeds from step SP24 to step SP27, where the central processing unit 69 generates predicted image data associated with simple inter prediction from the input image data. In next step SP28, the central processing unit 69 calculates prediction residual data resulting from inter prediction on the basis of the predicted image data. In next step SP29, the central processing unit 69 compares a total value of the prediction residual data resulting from the inter prediction with the total value of the prediction residual data resulting from the intra prediction. When the total value of the prediction residual data resulting from the intra prediction is smaller, the process proceeds to step SP25, where the central processing unit 69 sets the total value of the prediction residual data resulting from the intra prediction as residual data BD of the macroblock. The process then proceeds to step SP26 to return to the process procedure.

When the total value of the prediction residual data resulting from the inter prediction is smaller, on the other hand, the process proceeds from step SP29 to step SP30, where the central processing unit 69 sets the total value of the prediction residual data resulting from the inter prediction as residual data BD of the macroblock. The process then proceeds to step SP26 to return to the process procedure.

Incidentally, though not indicated in the process procedures represented in FIG. 10 and FIG. 11, the central processing unit 69 also calculates generated code quantities when the encoding process is performed for other picture types which quantities are necessary for the arithmetic processing of Equation (7) in the series of process procedures.

According to the embodiment 2, the same effects as those of the embodiment 1 can be obtained when image data is encoded by executing the encoding process program.

(5) Embodiment 3

Figure 13:
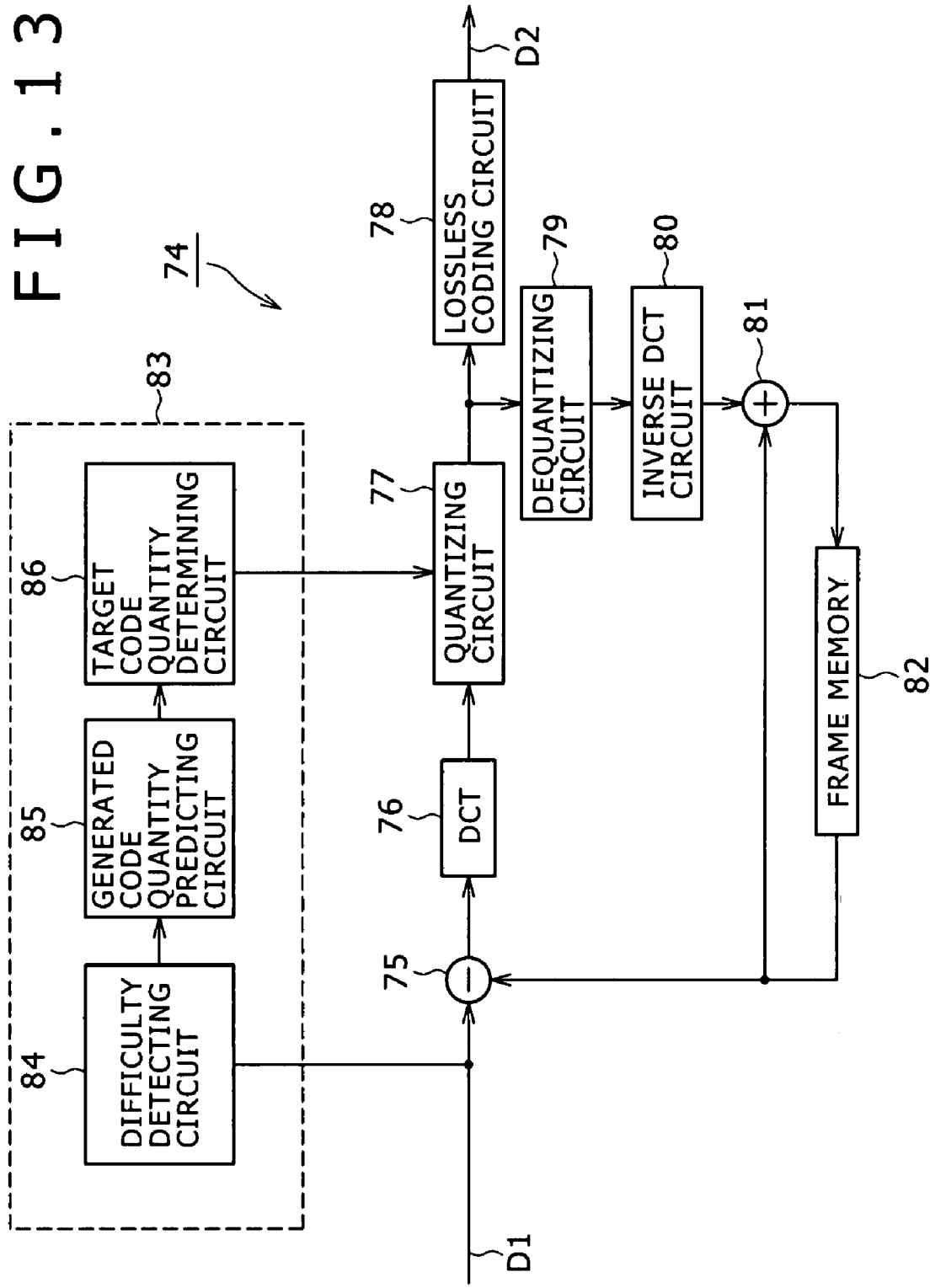
FIG. 13 is a block diagram showing an encoder according to an embodiment 3 of the present invention.

FIG. 13 is a block diagram showing an encoder according to an embodiment 3 of the present invention. This encoder 74 encodes input image data D1 by MPEG-2.

Specifically, the encoder 74 inputs the input image data D1 to a discrete cosine transform circuit 76 via a subtracting circuit 75, and generates coefficient data by the discrete cosine transform circuit 76. The coefficient data is quantized by a quantizing circuit 77, and is then output as encoded data D2 via a lossless coding circuit 78. In addition, the input image data D1 is decoded by a dequantizing circuit 79, an inverse discrete cosine transform circuit 80, and an adder circuit 81. The decoded input image data D1 is recorded in a frame memory 82. For P-pictures and B-pictures, predicted image data is generated by motion compensation using the image data recorded in the frame memory 82, and the predicted image data is input to the subtracting circuit 75.

An encoding control circuit 83 in the encoder 74 predicts a generated code quantity from the input image data D1, and sets the quantization scale of the quantizing circuit 77 on the basis of a result of the prediction to encode the image data D1 at a CBR by the one-pass system.

Specifically, a difficulty detecting circuit 84 in the encoding control circuit 83 detects a feature quantity indicating a degree of difficulty of an encoding process for each macroblock. Various methods can be applied to the detection of the feature quantity; for example, the signal level of a high-frequency component in the input image data may be applied.

A generated code quantity predicting circuit 85 sums feature quantities detected by the difficulty detecting circuit 84 in a picture unit. On the basis of a resulting total value, the generated code quantity predicting circuit 85 detects a true generated code quantity of each picture and true generated code quantities when the picture is encoded as other picture types.

A target code quantity determining circuit 86 calculates a target code quantity for each picture on the basis of a result of the process of the generated code quantity predicting circuit 85. The target code quantity determining circuit 86 sets the quantization scale of the quantizing circuit 77 such that an actual generated code quantity is the target code quantity.

Figure 14:
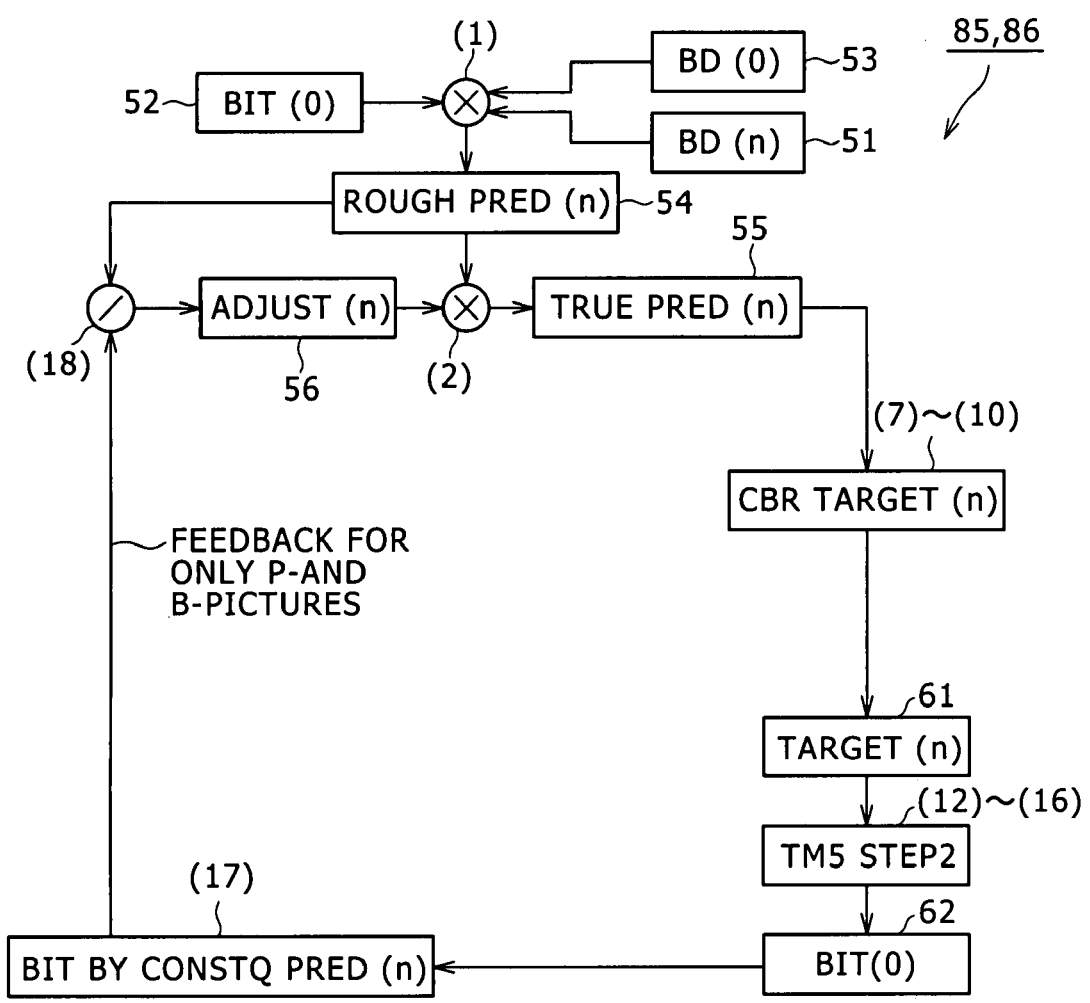
FIG. 14 is a block diagram showing a part of a configuration of the encoder of FIG. 13.

FIG. 14 is a block diagram showing details of a configuration of the generated code quantity predicting circuit 85 and the target code quantity determining circuit 86 by way of a comparison with FIG. 4.

The generated code quantity predicting circuit 85 is formed in the same manner as the generated code quantity predicting circuit 46 described above in the embodiment 1 except that the generated code quantity predicting circuit 85 calculates a roughly calculated generated code quantity and a true generated code quantity using feature quantities detected by the difficulty detecting circuit 84 in place of residual data MB BD.

The target code quantity determining circuit 86 is formed in the same manner as the target code quantity determining circuit 47 described above in the embodiment 1 except that the target code quantity determining circuit 86 does not have a configuration for the VBR and a configuration for switching between the CBR and the VBR.

According to the embodiment 3, even when an encoding process is performed by an encoding system without a large number of prediction modes, and even when an encoding process is performed with only a CBR, the same effects as those associated with the CBR encoding control described above in the embodiment 1 can be obtained.

Specifically, by calculating a true predicted code quantity by correcting a roughly calculated predicted code quantity predicted from the input image data by a correction coefficient, allotting an allocatable code quantity on the basis of the true predicted code quantity, and encoding the input image data, it is possible to allocate an appropriate code quantity to each picture when a recording time is to be guaranteed by the one-pass system.

Specifically, the conventional MPEG-2 sets a target code quantity for each picture by TM5. As described above with reference to FIG. 5 and FIG. 6, in the case of TM5, considerable ripples or fluctuations in generated code quantity occur. However, according to the embodiment 3, by allotting an allocatable code quantity on the basis of an instantaneous rate, it is possible to prevent such ripples or fluctuations in the generated code quantity, and accordingly allocate an appropriate code quantity to each picture. Incidentally, in the embodiment 3, the configuration of a feedback loop associated with the prediction of a generated code quantity is complex as compared with a conventional MPEG-2 encoder. With this configuration, however, when an MPEG-2 encoder and an AVC encoder are integrated into an integrated circuit, for example, the integrated circuit can be simplified by applying the configuration of the embodiment to the AVC encoder and using a part of the configuration in the MPEG-2 encoder.

(6) Other Embodiments

It is to be noted that while in the foregoing embodiments, description has been made of a case where an actual generated code quantity is converted to a generated code quantity when an encoding process is performed by a certain reference quantization scale by the process of Equation (17) and then a true predicted generated code quantity is corrected, the present invention is not limited to this; for example, a process for correcting the true predicted generated code quantity may be provided separately, or the true predicted generated code quantity may be corrected by correcting a roughly calculated predicted generated code quantity. Incidentally, in these cases, it is necessary to calculate a coefficient for the correction separately in correspondence with Equation (17).

In addition, while in the foregoing embodiments, description has been made of a case where the correction coefficient ADJUST(n) is set by the process of Equation (18) on the basis of only a result of processing of an immediately preceding picture, the present invention is not limited to this. The correction coefficient ADJUST(n) may be set by correcting a previously used correction coefficient ADJUST(n−1) by the result of processing of the immediately preceding picture. Then, it is possible to prevent accuracy of prediction of the true generated code quantity from being degraded due to a temporary change in picture quality due to strobe light emission or the like.

In addition, while in the foregoing embodiments, description has been made of a case where the encoding process is performed with only the CBR when the process is switched between the VBR and the CBR, the present invention is not limited to this. The present invention is widely applicable to cases where the encoding process is performed with only the VBR in a configuration associated with the changing of an average generated code quantity, a configuration for decreasing a compression ratio when a degree of difficulty is low, and the like.

In addition, while in the foregoing embodiments, description has been made of a case where an orthogonal transform process is performed by a discrete cosine transform process, the present invention is not limited to this. The present invention is widely applicable to cases where orthogonal transform processing by a Karhunen-Loeve transform and the like is applied.

In addition, while in the foregoing embodiments, description has been made of a case where the encoding process is performed by AVC and MPEG-2, the present invention is not limited to this. The present invention is widely applicable to cases where the encoding process is performed in various formats.

INDUSTRIAL APPLICABILITY

The present invention relates to an encoding method, an encoding device, an encoding process program, and a recording medium on which the encoding process program is recorded, and is applicable to video cameras, for example.

The invention claimed is:

1. An encoding method in which a picture type is sequentially set to pictures of input image data, said input image data is encoded while predicting a generated code quantity of each picture, and encoded data is generated, said encoding method comprising the steps of:
    predicting by use of a predicting circuit a roughly calculated code quantity of said encoded data generated from said input image data;
    calculating a true predicted code quantity by correcting said roughly calculated predicted code quantity by a correction coefficient corresponding to said picture type;
    encoding said input image data on a basis of said true predicted code quantity; and
    setting said correction coefficient of the corresponding picture type with detecting an actual generated code quantity of said encoded data.

2. The encoding method as claimed in claim 1, wherein:
    said coefficient setting step sets said correction coefficient on a basis of a ratio between said roughly calculated predicted code quantity detected in a picture for which an encoding process is completed and an actual generated code quantity of said encoded data corresponding to the picture.

3. The encoding method as claimed in claim 1, wherein:
    said encoding step encodes said input image data of at least a picture at a start of a sequence of each picture type by a fixed quantization scale set in advance; and
    with a ratio between a feature quantity, indicating a degree of difficulty of encoding, which is detected in the picture at the start of said sequence and the feature quantity detected in a picture to be encoded, said roughly calculated code quantity predicting step calculates said roughly calculated predicted code quantity of said picture to be encoded on a basis of the actual generated code quantity of said encoded data obtained by said fixed quantization scale.

4. The encoding method as claimed in claim 1, further comprising the step of setting a target code quantity of an encoding process on the basis of said true predicted code quantity,
    wherein said encoding step encodes said input image data on the basis of said true predicted code quantity by setting a quantization scale such that the actual generated code quantity of said encoded data becomes said target code quantity,
    when said true predicted code quantity is smaller than a certain value, said target code quantity setting step sets said true predicted code quantity to said target code quantity so as to generate said encoded data with a VBR, and
    when said true predicted code quantity is larger than said certain value, said target code quantity setting step sets a code quantity corresponding to said certain value to said target code quantity so as to generate said encoded data with a CBR.

5. The encoding method as claimed in claim 1, wherein:
    said encoding step encodes said input image data of at least a picture at a start of a sequence of each picture type by a fixed quantization scale set in advance;
    with a ratio between a feature quantity, indicating a degree of difficulty of encoding, which is detected in the picture at the start of said sequence and the feature quantity detected in a picture to be encoded, said roughly calculated code quantity predicting step calculates said roughly calculated predicted code quantity of said picture to be encoded on a basis of the actual generated code quantity of said encoded data obtained by said fixed quantization scale; and
    said encoding method changes an average generated code quantity of said encoded data by changing said fixed quantization scale in response to an operation by a user.

6. The encoding method as claimed in claim 5, further comprising the step of setting a target code quantity of an encoding process on the basis of said true predicted code quantity,
    wherein said encoding step encodes said input image data on the basis of said true predicted code quantity by setting a quantization scale such that the actual generated code quantity of said encoded data becomes said target code quantity,
    when said true predicted code quantity is smaller than a certain value, said target code quantity setting step sets said true predicted code quantity to said target code quantity so as to generate said encoded data with a VBR,
    when said true predicted code quantity is larger than said certain value, said target code quantity setting step sets a code quantity corresponding to said certain value to said target code quantity so as to generate said encoded data with a CBR, and
    said encoding method changes said certain value associated with switching of encoding control between said VBR and said CBR in such a manner as to be interlocked with changing of said fixed quantization scale.

7. The encoding method as claimed in claim 6, wherein:
    a recordable time of said recording medium on which said encoded data is recorded is changed by changing said certain value and said quantization scale.

8. The encoding method as claimed in claim 1, further comprising the steps of:
    setting a target code quantity of an encoding process on the basis of said true predicted code quantity; and
    correcting said true predicted code quantity;

wherein said encoding step encodes said input image data on the basis of said true predicted code quantity by setting a quantization scale such that the actual generated code quantity of said encoded data becomes said target code quantity, and said correcting step corrects said true predicted code quantity to a generated code quantity predicted when said quantization scale is set to a certain reference quantization scale.

9. The encoding method as claimed in claim 8, wherein:
said correcting step corrects said true predicted code quantity by converting said actual generated code quantity to the generated code quantity predicted when the quantization scale in said encoding step is set to the certain reference quantization scale, and by setting said correction coefficient of said corresponding picture type on the basis of the converted generated code quantity.

10. The encoding method as claimed in claim 9, wherein:
said coefficient setting step converts said actual generated code quantity according to the equation:

$$BIT\ BY\ CONSTQ\ PRED = e^{(k*(QP\ CONSTQ - QP\ AVERAGE))} * BIT,$$

where BIT BY CONSTQ PRED is the generated code quantity after conversion, QP AVERAGE is an average quantization scale of quantization scales in each macroblock when actual encoding is performed, QP CONSTQ is said certain reference quantization scale, BIT is said actual generated code quantity, k is a coefficient, and ^ denotes a power operator.

11. The encoding method as claimed in claim 10, wherein:
said coefficient k is −0.1126.

12. The encoding method as claimed in claim 8, wherein:
when said true predicted code quantity is smaller than a certain value, said target code quantity setting step sets said true predicted code quantity to said target code quantity so as to generate said encoded data with a VBR, and when said true predicted code quantity is larger than said certain value, said target code quantity setting step sets a code quantity corresponding to said certain value to said target code quantity so as to generate, said encoded data with a CBR.

13. The encoding method as claimed in claim 8, wherein:
said encoding step encodes said input image data of at least a picture at a start of a sequence of each picture type by a fixed quantization scale set in advance;
with a ratio between a feature quantity, indicating a degree of difficulty of encoding, which is detected in the picture at the start of said sequence and the feature quantity detected in a picture to be encoded, said roughly calculated code quantity predicting step calculates said roughly calculated predicted code quantity of said picture to be encoded on a basis of the actual generated code quantity of said encoded data obtained by said fixed quantization scale; and
said encoding method changes an average generated code quantity of said encoded data by changing said fixed quantization scale in response to an operation by a user.

14. The encoding method as claimed in claim 13, wherein:
when said true predicted code quantity is smaller than a certain value, said target code quantity setting step sets said true predicted code quantity to said target code quantity so as to generate said encoded data with a VBR;
when said true predicted code quantity is larger than said certain value, said target code quantity setting step sets a code quantity corresponding to said certain value to said target code quantity so as to generate said encoded data with a CBR; and said certain value associated with switching of encoding control between said VBR and said CBR is changed in such a manner as to be interlocked with changing of said fixed quantization scale.

15. The encoding method as claimed in claim 14, wherein:
a recordable time of said recording medium on which said encoded data is recorded is changed by changing said certain value and said quantization scale.

16. The encoding method as claimed in claim 1, further comprising the step of setting a target code quantity of an encoding process on the basis of said true predicted code quantity, wherein said encoding step encodes said input image data by setting a quantization scale such that the actual generated code quantity of said encoded data becomes said target code quantity, said roughly calculated code quantity predicting step also obtains said roughly calculated predicted code quantities for other picture types when a picture to be encoded is encoded as the other picture types, said true code quantity predicting step also obtains true predicted code quantities for the other picture types from the roughly calculated predicted code quantities for said other picture types, and said target code quantity setting step allots an allocatable code quantity on the basis of said true predicted code quantity for the corresponding picture type and the true predicted code quantities for said other picture types, and sets said target code quantity.

17. The encoding method as claimed in claim 16, wherein:
said allocatable code quantity is allotted on an assumption that said true predicted code quantity for said corresponding picture type and the true predicted code quantities for said other picture types are the generated code quantity of each picture in one GOP.

18. The encoding method as claimed in claim 1, further comprising the step of setting a target code quantity of an encoding process on the basis of said true predicted code quantity, wherein said encoding step encodes said input image data by setting a quantization scale such that the actual generated code quantity of said encoded data becomes said target code quantity, when said true predicted code quantity is smaller than a certain value larger than said reference value for image quality improvement, said target code quantity setting step sets said true predicted code quantity to said target code quantity so as to generate said encoded data with a VBR, when said true predicted code quantity is larger than said certain value, said target code quantity setting step sets a code quantity corresponding to said certain value to said target code quantity so as to generate said encoded data with a CBR, and when said true predicted code quantity is smaller than said reference value for picture quality improvement, said target code quantity setting step sets said true predicted code quantity to said target code quantity increased by a coefficient, wherein said coefficient increases as said true predicted code quantity is decreased.

19. The encoding method as claimed in claim 18, wherein:
said target code quantity setting step limits an increase in said coefficient to a certain value.

20. An encoding device in which a picture type is sequentially set to pictures of input image data, said input image data is encoded while predicting a generated code quantity of each picture, and encoded data is generated, said encoding device comprising:

roughly calculated code quantity predicting means for predicting a roughly calculated code quantity of said encoded data generated from said input image data;

true code quantity predicting means for calculating a true predicted code quantity by correcting said roughly calculated predicted code quantity by a correction coefficient corresponding to said picture type;

encoding means for encoding said input image data on a basis of said true predicted code quantity; and coefficient setting means for setting said correction coefficient of the corresponding picture type with detecting an actual generated code quantity of said encoded data.

21. The encoding device as claimed in claim 20, wherein:
said input image data is input from integrally retained image pickup means.

22. A non-transitory recording medium on which an encoding process program executable by arithmetic processing means, for sequentially setting a picture type to pictures of input image data, encoding said input image data while predicting a generated code quantity of each picture, and generating encoded data is recorded, said encoding process program comprising the steps of:

predicting a roughly calculated code quantity of said encoded data generated from said input image data;

calculating a true predicted code quantity by correcting said roughly calculated predicted code quantity by a correction coefficient corresponding to said picture type;

encoding said input image data on a basis of said true predicted code quantity; and setting said correction coefficient of the corresponding picture type with detecting an actual generated code quantity of said encoded data.

23. An encoding device in which a picture type is sequentially set to pictures of input image data, said input image data is encoded while predicting a generated code quantity of each picture, and encoded data is generated, said encoding device comprising:

a roughly calculated code quantity predicting unit which predicts a roughly calculated code quantity of said encoded data generated from said input image data;

a true code quantity predicting unit which calculates a true predicted code quantity by correcting said roughly calculated predicted code quantity by a correction coefficient corresponding to said picture type;

an encoding unit which encodes said input image data on a basis of said true predicted code quantity; and a coefficient setting unit which sets said correction coefficient of the corresponding picture type with detecting an actual generated code quantity of said encoded data.

* * * * *